United States Patent [19]

Rosenbaum et al.

[11] Patent Number: 4,527,319
[45] Date of Patent: Jul. 9, 1985

[54] METHOD AND APPARATUS FOR MANUFACTURING FOLDABLE CONDUIT

[75] Inventors: Larry A. Rosenbaum; H. John Sidaway, both of Findlay, Ohio

[73] Assignee: Hancor, Inc., Findlay, Ohio

[21] Appl. No.: 306,467

[22] Filed: Sep. 28, 1981

[51] Int. Cl.³ .............................................. B29C 29/08
[52] U.S. Cl. ................................ 29/33 T; 29/526 A; 83/343; 83/861; 156/504; 156/555; 156/517; 156/353
[58] Field of Search ............... 156/504, 517, 555, 578, 156/359, 252, 353; 83/343, 344, 346, 678, 861, 176, 425, 871, 874; 118/411; 29/33 T, 526 A; 226/172

[56] References Cited

U.S. PATENT DOCUMENTS

| | | | |
|---|---|---|---|
| 1,403,740 | 1/1922 | Day | 83/344 |
| 1,606,270 | 11/1926 | Stratford | 280/261 |
| 2,679,924 | 6/1954 | Powell | 226/172 |
| 2,771,534 | 11/1956 | Schwahn | 83/343 |
| 2,978,791 | 4/1961 | Clar | 29/526 A |
| 3,109,339 | 11/1963 | Braun et al. | 83/425 |
| 3,248,463 | 4/1966 | Wiley et al. | 264/95 |
| 3,307,995 | 3/1967 | Martin, Sr. | 156/517 |
| 3,661,679 | 5/1972 | Law | 118/411 |
| 3,732,046 | 5/1973 | Martin et al. | 425/140 |
| 3,742,906 | 7/1973 | Dupke | 118/411 |
| 3,767,510 | 10/1973 | Gustafson | 156/555 |
| 3,786,365 | 10/1973 | Howe | 83/678 |
| 3,834,275 | 9/1974 | Newland | 83/861 |
| 3,910,713 | 10/1975 | Maroschak | 408/1 |
| 3,947,947 | 4/1976 | Hess et al. | 29/564.2 |
| 4,001,067 | 1/1977 | Johnson | 156/504 |
| 4,115,495 | 9/1978 | Hartitz | 264/90 |
| 4,116,399 | 9/1978 | Mosburger et al. | 156/504 |
| 4,124,426 | 11/1978 | Saul | 156/193 |
| 4,172,755 | 10/1979 | Gustafson et al. | 156/504 |
| 4,194,081 | 3/1980 | Medford | 174/47 |
| 4,233,104 | 11/1980 | Fujishima et al. | 156/504 |
| 4,245,924 | 1/1981 | Fouss et al. | 405/45 |
| 4,357,190 | 11/1982 | Fouss et al. | 156/292 |

FOREIGN PATENT DOCUMENTS 52-010363 1/1977 Japan.

Primary Examiner—Gil Weidenfeld
Assistant Examiner—Daniel W. Howell
Attorney, Agent, or Firm—Fay & Sharpe

[57] ABSTRACT

A sleeve of plastic material from an extruder is molded by a blow molding apparatus into a tubular structure which includes two top walls longitudinally connected at base ends and apex ends. A splitting apparatus splits the longitudinally connected base ends apart to form two top walls. The top walls are oriented with their base ends upward. An extruder extrudes a flow of softened plastic which is divided by a manifold into four flows. Four applicators connected with the manifold apply beads of softened plastic along each top wall base end. A ribbed roller presses flexible strips against the plastic beads on each of the top walls. The flexible strips are fed from rolls of finite length mounted on a stand. The stand holds operating rolls and back up rolls. A splicing apparatus splices the trailing end of each operating roll with a leading end of the corresponding back up roll. An accumulator accumulates a reserve of the flexible strip between splices and feeds out the reserve during a splice such that the flexible strip is fed continuously to the ribbed roller. A perforator apparatus perforates the flexible strip and a vent trimmer perforates the top wall. A puller clamps the conduit in a folded configuration to pull it through the splitter, and ribbed roller. The folded conduit is cut to length and wound on reels.

57 Claims, 20 Drawing Figures

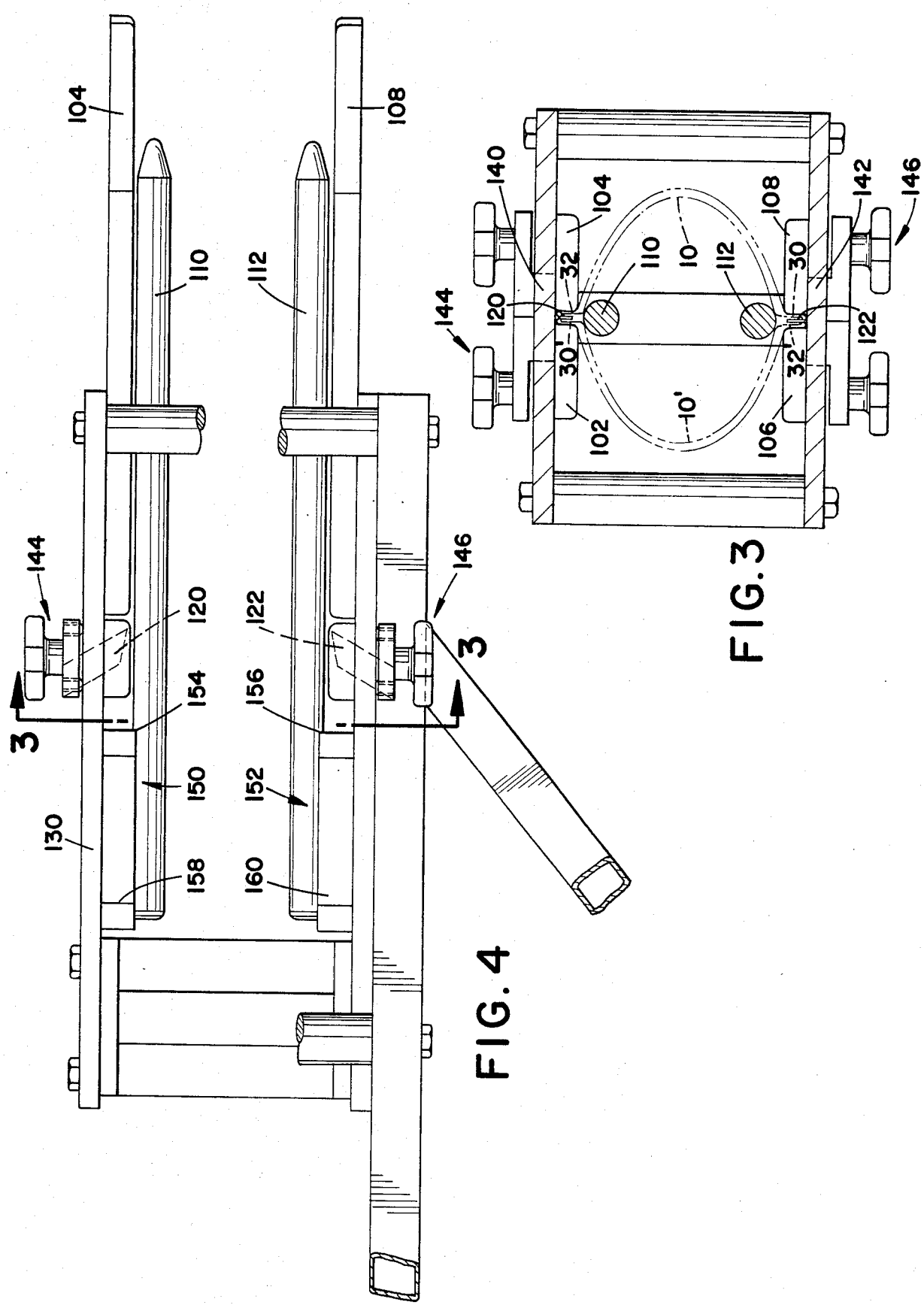

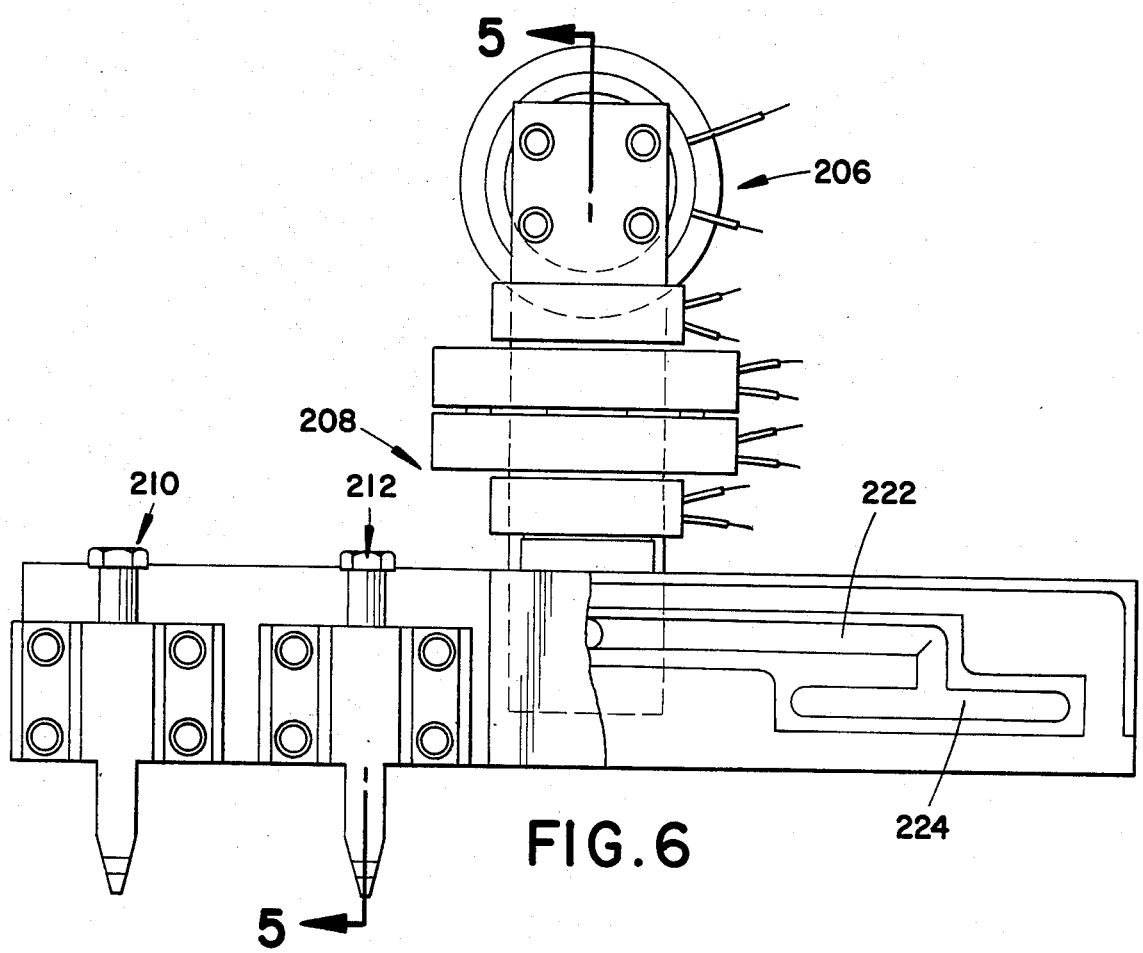
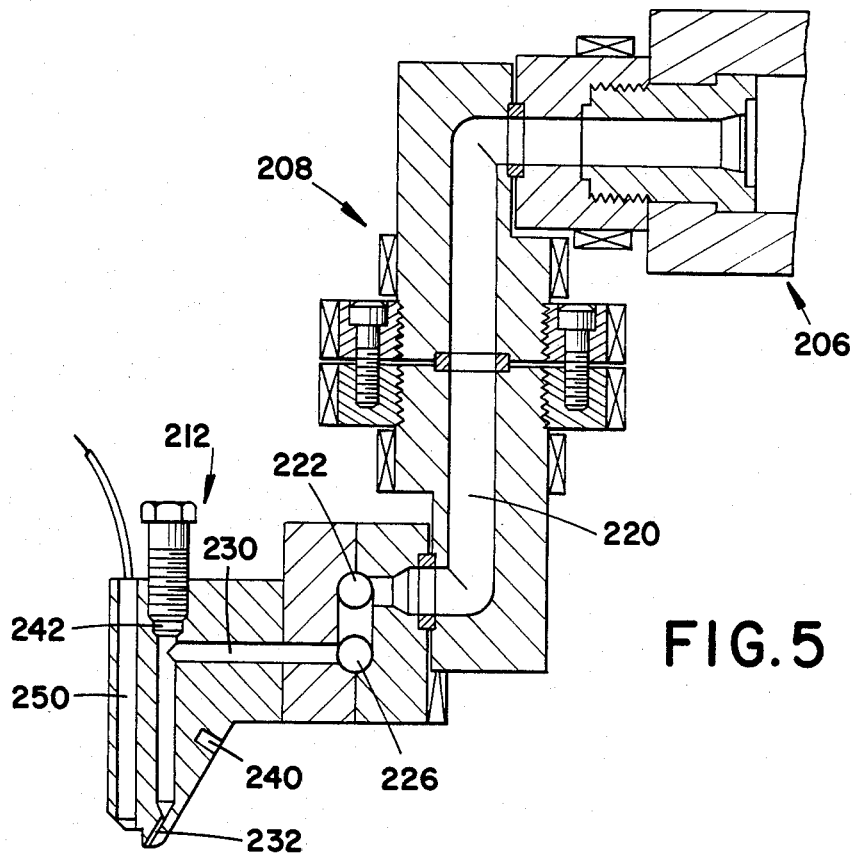

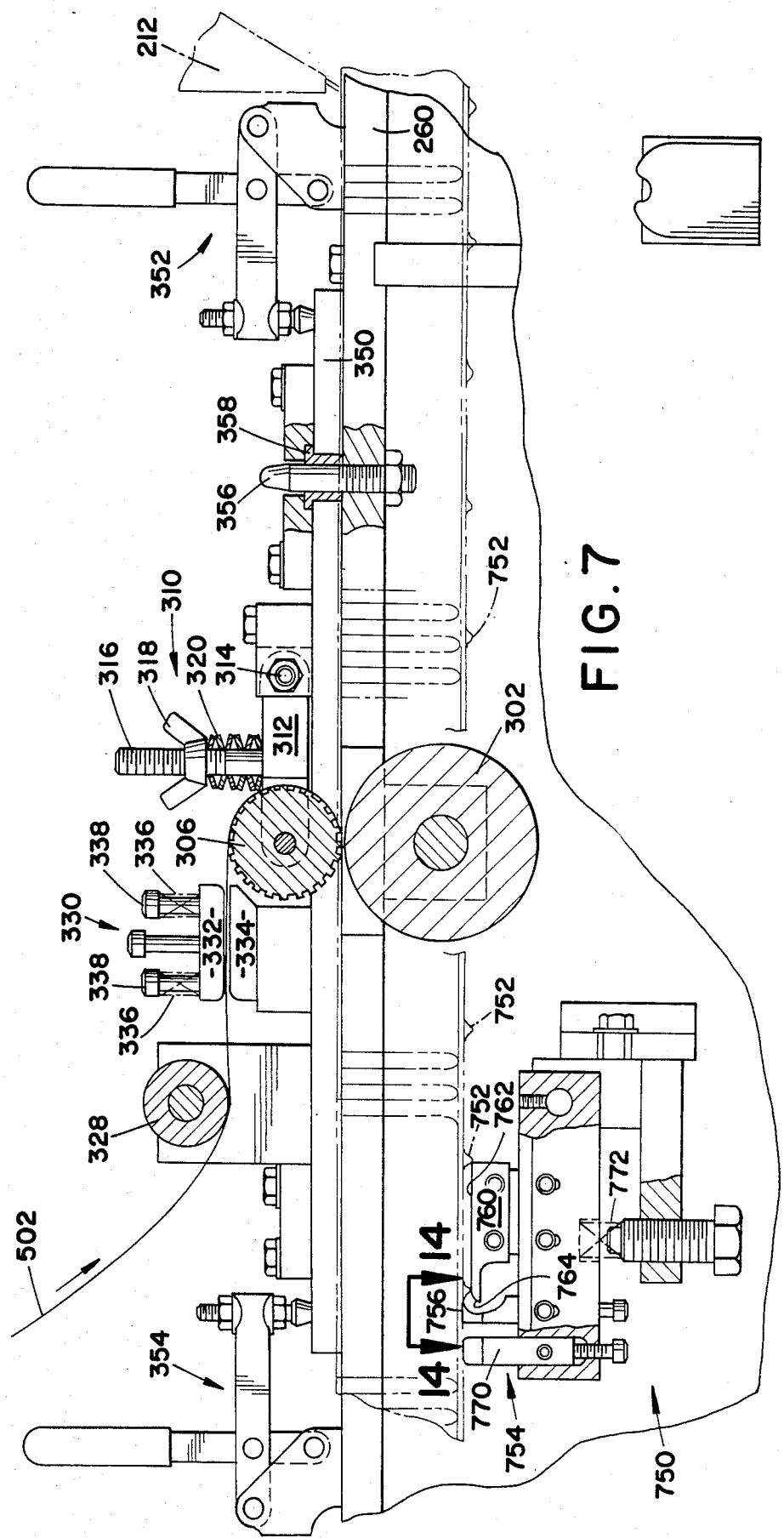

METHOD AND APPARATUS FOR MANUFACTURING FOLDABLE CONDUIT

BACKGROUND OF THE INVENTION

This application pertains to the art of manufacturing plastic conduits and more particularly to the art of manufacturing corrugated, foldable plastic tubing. The invention is particularly applicable to corrugated, plastic drainage tubing and will be described with reference thereto. It is to be appreciated, however, that the invention has broader applications such as manufacturing septic or leach bed tubings, subterranean conduits, other fluid conveying channels, pipes for shielding electrical cables, and the like.

In the past, most corrugated drainage tubing has been circular in cross section. The circular tubing is generally manufactured in a linear production line assembly which produces a single length of tubing. Commonly, a plastic extruding machine fitted with a circular extrusion die receives pellets of a thermoplastic material and extrudes a plastic sleeve of softened plastic through the die. A continuous blow molding assembly is positioned closely adjacent the extruder die to shape the extruded sleeve into circular corrugated tubing. Commonly, the blow molding assembly includes two runs of semicircular mold blocks which travel linearly along parallel paths adjacent the extruder die as pneumatic pressure forces the sleeve into conformity the interior surface of the blocks. The mold blocks draw heat out of the tubing as they travel away from the extrusion die. When the plastic tubing cools sufficiently to retain its molded shape, the mold blocks separate and return to the initial position.

After the tubing is molded, it is generally cooled with a water bath. If the tubing is to be used for drainage tubing, the continuous length of tubing is commonly conveyed adjacent a slotting saw which cuts a series of thin slots into the side walls of the tubing. If the tubing is to be used for septic tubing, the tubing is commonly conveyed through a drilling machine which drills round holes about three-quarters of an inch in diameter into the side walls of the tubing. If the tubing is to be used for conveying fluid, generally, it is neither slotted nor drilled. On some occasions, the assembly line may include a device for wrapping the drilled or slotted tubing with a filter material which inhibits small particles from entering the tubing. The round corrugated tubing is commonly cut in ten foot length or coiled in 250 foot rolls.

The present assignee has previously developed an arched corrugated conduit which has improved strength characteristics. This, arched conduit is described in U.S. Pat. No. 3,861,925, issued Aug. 8, 1972. When manufacturing this arched conduit, only a single length of conduit is produced on each assembly line. The present assignee subsequently developed the foldable, arched conduit which is described in the U.S. Pat. No. 4,245,924, issued Jan. 20, 1981. The foldable conduit is an improvement over the prior arched and circular conduits in that two or more lengths of conduit are manufactured concurrently on a single production line. Previously, the present assignee has filed U.S. patent application Ser. No. 162,006, filed June 23, 1980, now U.S. Pat. No. 4,357,190 and patent application Ser. No. 240,602, filed Mar. 4, 1981, now U.S. Pat. No. 4,374,079 both directed to methods and apparatus for manufacturing foldable tubing. Although the method and apparatus for manufacturing plastic tubing disclosed in these earlier applications has been reasonably successful, the present invention increases the speed at which the conduit is manufactured and improves the quality and appearance of the conduit.

SUMMARY OF INVENTION

The present invention contemplates a new and improved method and apparatus for manufacturing plastic conduit which efficiently produces a plurality of conduit products on a common production line.

In accordance with the first aspect of the present invention, there is provided a method for concurrently manufacturing at least two conduit products. Each conduit product includes a pair of relatively strong side walls which are connected with each other at an apex area and a flexible base which is connected adjacent a base end of each of the side walls disposed opposite the apex area. The method comprising substantially continuously conveying at least two top walls, each of which has a pair of side walls that are longitudinally connected at their apex area and unconnected at their base ends, attaching a strip of elongated flexible material adjacent the base end of each side wall such that with the attachment of the flexible strip each conduit product has a pair of relatively strong side walls connected at the apex area and a flexible base connecting the side walls, and pulling the conduit products substantially continuously such that the extruding, molding, splitting and attaching steps are carried out on substantially continuous lengths of conduit product.

In accordance with a more limited aspect of the invention, the method further includes feeding the flexible strip from a roll, splicing a leading end of another flexible strip roll to the trailing end of the roll such that the flexible strip fed to the attaching means is supplied substantially continuously.

In accordance with a still more limited aspect of the invention, the method further includes accumulating a reserve of the flexible strip between splices and feeding out the reserve during splices.

In accordance with another more limited aspect of the invention, the method includes perforating the flexible strip and perforating the apex area of the top wall.

In accordance with another aspect of the invention, there is provided an apparatus for manufacturing the plastic conduit products which have a relatively strong top wall having longitudinally extending base ends and a flexible base connected adjacent the base ends. The manufacturing apparatus comprises means for conveying substantially continuously at least one conduit product top wall, attaching means for attaching a strip of flexible material adjacent the base ends of each top wall to form the conduit products, flexible material feeding means for feeding at least one substantially continuous strip of flexible material to the attaching means, and pulling means for pulling the conduit products such that the top walls are pulled from the continuous molding means through the splitting and attaching means and to pull the flexible strips to and through the attaching means.

In accordance with a more limited aspect of the invention, there is provided extruding means for extruding a plastic sleeve, molding means for molding the sleeve into a pair of top walls longitudinally connected at the base ends, and splitting means for splitting the connected base ends apart. The splitting means includes a pair of knife blades removably disposed normal to the moving, connected top walls for splitting the two top walls apart. The splitting means further includes a pair of dividers each having sharp upstream edges disposed adjacent and downstream from the blades for urging base ends of the top walls apart and for splitting the base ends apart when one of the blades is removed for replacement.

In accordance with another more limited aspect of the invention there is provided an improved attaching means which includes a plastic extruder for extruding a flow of plastic material, a manifold for dividing the plastic material flow into at least four flow paths, and an applicator connected with each of the manifold flow paths for applying a bead of softened plastic adjacent the base ends of each of the top walls and a ribbed roller disposed downstream from the applicators for pressing the flexible strips against the softened plastic bead.

In accordance with another more limited aspect of the invention, there is provided an improved pulling means which includes two pair of parallel disposed belts, one belt of each pair being driven by a first wheel and the other belt of each pair being driven by a second wheel. A flexible drive passes around the first wheel in one direction and around the second wheel in the opposite direction and over an idler means to maintain constant tension such that the belts in each pair are rotated in the opposite directions to pull the conduit therebetween.

In accordance with yet another more limited aspect of the invention there is provided an improved flexible strip feeding means which includes a stand for holding an operating roll of the flexible material and for holding a back up roll of the flexible material. The feeding means further includes an improved splicing means for connecting the leading end of the back up reel with the trailing end of the operating reel such that lengths of flexible strips are connected together to form a continuous length. An accumulating means is provided for continuing to feed the flexible strip to the attaching means as the splicing means is splicing the lengths together. The feeding means may also include a flexible strip perforator for perforating the flexible strip passing therethrough.

A principal advantage to the present invention is it allows a plurality of conduit products to be formed on a single assembly line. The present invention increases the speed of production, thus decreasing the cost.

BRIEF DESCRIPTION OF THE FIGURES

The invention may take form in certain parts or steps and arrangements of parts or steps. The FIGURES are for purposes of illustrating a preferred embodiment of the invention only and are not to be construded as limiting the invention.

FIGS. 3 and 4 are further illustrative of a splitting means of the block diagram of FIG. 2;

FIGS. 5 and 6 are further illustrative of a heated plastic bead applying means of the attaching means illustrated in the block diagram of FIG. 2;

FIGS. 7 and 8 are further illustrative of a pressing means of the attaching means illustrated in the block diagram of FIG. 2;

FIG. 14 is illustrative of a cutting blade of an apex area perforator of FIG. 7;

DESCRIPTION OF THE PREFERRED EMBODIMENT

Figure 1:
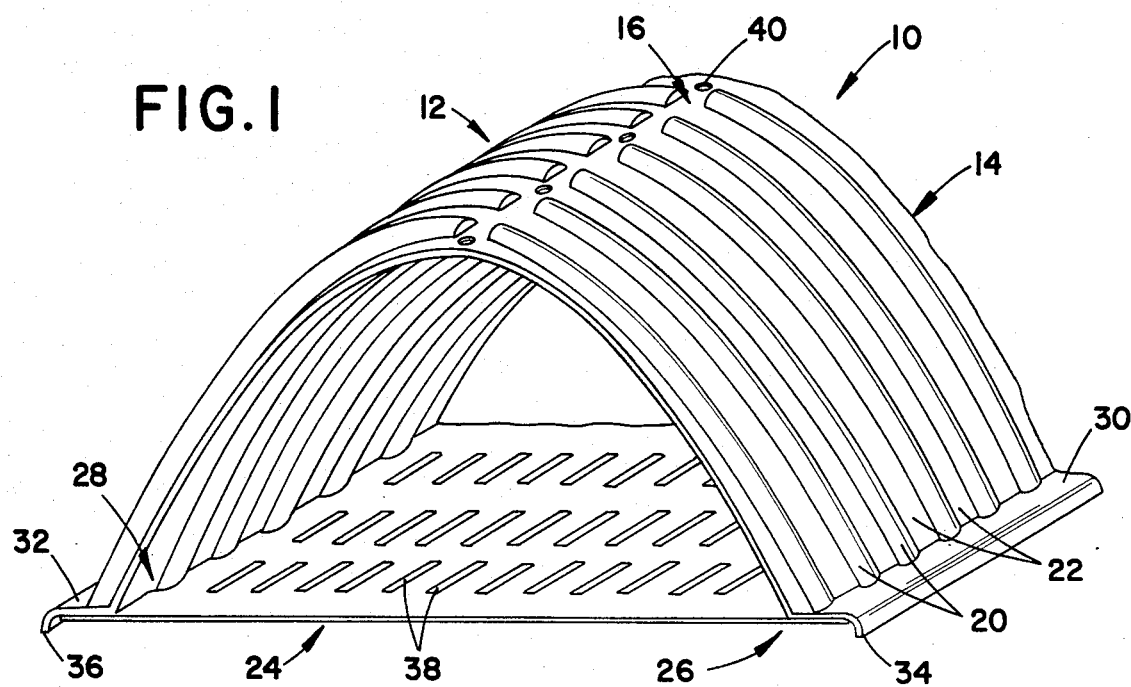
FIG. 1 illustrates a foldable conduit product which is manufacturable with the method or apparatus of the present invention.

To facilitate understanding the method and apparatus for manufacturing a conduit product, an exemplary product manufacturable by the method and apparatus is illustrated in FIG. 1. The conduit product has a relatively strong top wall 10 which includes a first side wall 12 and a second side wall 14 which are longitudinally connected at an apex area by a hinge means 16. The top wall is configured with sufficient strength to withstand the compressive forces of backfill and ground water when installed in subterranean locations. To assist in providing this strength, each of the side walls includes a plurality of alternating peaks 20 and valleys 22 which define transverse corrugations along the side walls. The conduit product further includes a flexible, generally flat base portion 24 which is connected with each side wall adjacent base ends 26 and 28 opposite the apex area. To facilitate the connection and to provide a bearing surface for the side walls, each side wall has adjacent its base end a flange portion 30 and 32. To inhibit the flange portions from undergoing transverse, sliding movement, each flange portion includes a claw portion 34 and 36 which digs into the soil below the base. To fold the conduit, the flexible base 24 is folded toward the apex area as the flange portion are brought together forming a flattened, folded conduit configuration. If the conduit is to be used for drainage or effluent dispersal it is perforated with a plurality of base apertures or slits 38 in the base portion and a plurality of apex apertures 40 in the hinge portion. Optionally, additional apertures may be provided in the side walls.

Figure 2:
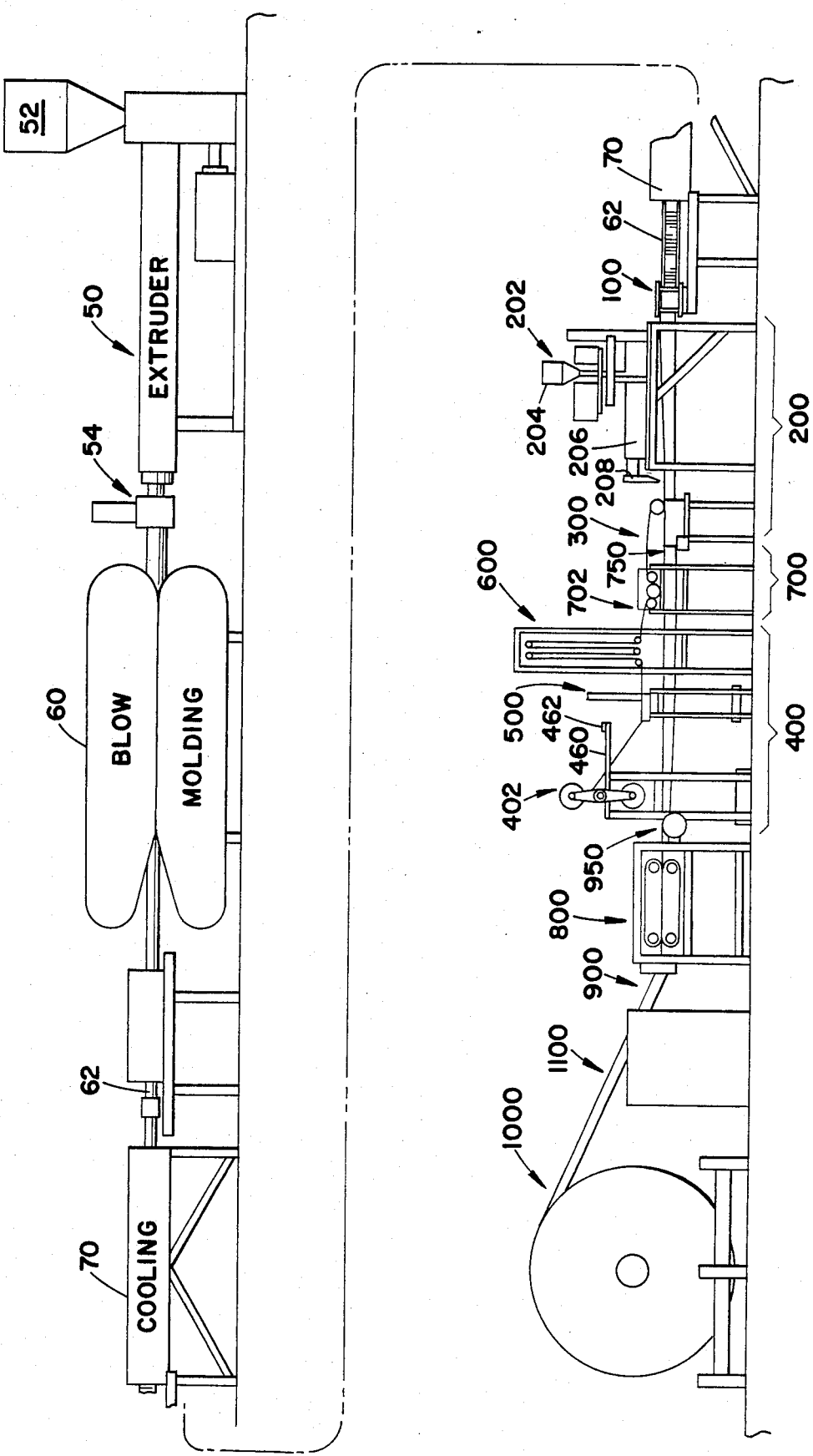
FIG. 2 is a block diagram of steps or means for manufacturing conduit products in accordance with the present invention.

In FIG. 2, a diagramatic illustration of the method and apparatus of manufacturing a foldable conduit product, such as the product illustrated in FIG. 1, is presented. The first step in the manufacturing process is the extrusion of a sleeve of softened plastic material. The extrusion step is performed with an extruder 50 which receives pellets of plastic resin from a resin hopper 52 which it plasticizes with heat and pressure. Under the heat and pressure, the plastic is softened and forced through an extrusion die 54 which conforms roughly with the shape of the conduit product to be manufactured. In the preferred embodiment, a round generally elliptical extrusion die is utilized which produces a generally oval tubular sleeve of plastic material. Optionally, the extrusion die 54 may receive a plurality of flows of softened materials which it channels into layers to produce a layered softened plastic sleeve.

A second step of the manufacturing process is continuously molding the extruded sleeve into a preselected top wall or plurality of longitudinally connected top walls. The molding is preferably performed with a continuous blow molding apparatus 60 which includes a plurality of pairs of mold blocks, one mold block of each pair being connected into a first run and the other being connected in a second run. The pairs of mold block come together around the sleeve at the upstream end adjacent the extrusion die 54 and move linearly away from the extruder while pneumatic pressure forces the sleeve into conformity with the mold blocks. As the mold blocks move away from the extruder, the plastic sleeve cools sufficiently that it is able to retain the shape imparted to it by the mold blocks. At the downstream end of the blow molding apparatus, the mold blocks separate and a molded generally tubular structure 62 emerges. In operation, the mold blocks circulate continuously forming the soft plastic sleeve into a semirigid, generally tubular structure. Although the shape of the tubular structure 62 is determined by the mold blocks, in the preferred embodiment, the tubular structure includes four side walls which are connected longitudinally front and back adjacent their apex ends and connected top and bottom adjacent their base ends. Alternately, the generally tubular structure may include more than two longitudinally connected top walls, may be smoothed walled, or may have various other cross sections including semicircular, semielliptical, triangular, and other arched configurations. Taken together, the extruding and blow molding steps and apparatus constitute a method and means for substantially continuously forming an elongated tubular structure which includes a plurality of longitudinally adjoining conduit product top walls.

The next step in the manufacturing process is cooling the plastic generally tubular structure 62 to bring it to a more rigid state. A cooling means 70 removes heat from the tubular structure. Numerous conventional cooling means may be utilized such as a spray of water and air or a bath of cool water.

With continued reference to FIG. 2, the next step in the manufacturing process is splitting the generally tubular structure into the plurality of conduit top walls. To separate the adjoining top walls, the tubular structure 62 is passed through a splitting means 100. In the preferred embodiment which is explained below in greater detail, the splitting means guides the continuously moving tubular structure against stationary knife blades. The knife blades are disposed such that the base ends, particularly the claw portions 34 and 36, are split apart by the knife blades. A plurality of top walls, particularly a front top wall and a rear top wall (in the reference system of FIG. 2), are separated and conveyed continuously from the splitting means 100. This splitting step need not be accomplished by cutting with a knife. Rather, the adjoining top walls may be melted apart with a hot wire or blade, sawn, or may be extruded with a weaken region or detached area between the top walls, or the like. Taken together, the extruding means 50, molding means 60, and splitting means 100 comprise a conveying means for conveying at least one top wall substantially continuously. Once split, the front and rear top walls all undergo substantially the same manufacturing steps with substantially identical apparatus. For simplicity of illustration, the front line is explained in detail and it is to be understood that this explanation applies by analogy to the rear line. Where illustrated, parts in the rear line, unless stated otherwise, have the same reference numeral as like parts in the front line but followed by a prime (').

The next step in the manufacturing process is attaching a strip of flexible material to the base ends of the front and rear top walls. An attaching means 200 receives and attaches the continuously conveyed top walls from the splitting means 100 with a continuous flexible material strip or strips. In the preferred embodiment, there are two flexible strips—a front flexible strip which is attached to the front top wall and a rear flexible strip which is attached to the rear top wall. The present invention also contemplates attaching a single flexible strip to both top walls and dividing the strip after the attachment step. Further to the preferred embodiment, the tubular structures are twisted 90° to orient their base ends upward. A bead applying means 202 applies an attaching bead of softened plastic, adhesive, solvent, or the like adjacent each top wall base end, particularly along the upward facing underside of the flange portions 22 and 24 as the top wall move continuously there beneath. A pressing means 300 continuously presses the flexible strips against the attaching bead and the top wall base ends. Alternately, other attaching means, such as sewing, stapling, ultrasonic welding, heat fusion, or the like, may be utilized.

Concurrently with the attaching step, the flexible strips are fed continuously to the attaching means. A flexible material feeding means 400 feeds substantially continuous flexible strips to the attaching means. In the preferred embodiment, the feeding means feeds the flexible strips from rolls of finite length which it splices together into continuous strips. A take-off stand 402 holds front operating and back up rolls and rear operating and back up rolls. The flexible strips from the operating rolls are fed through a splicer 500 to the attaching means 200. The leading ends of the flexible strips from the back up rolls are mounted in the splicer 500. When it is determined that one of the operating rolls is approaching its trailing end, the splicer is actuated to splice the leading end of the corresponding back up strip adjacent the trailing end of the operating strip. An accumulator means 600 is provided to enable the feeding means to feed the flexible strips continuously even during a splice. The accumulator means 600 accumulates a reserve of the front flexible strip and a reserve of the rear flexible strip between splices. During a splicing operation, the accumulator plays out the corresponding flexible strip reserve such that the feeding means 400 feeds the flexible strips continuously, even when one of the strips stops to be spliced. Alternately, the feeding means may including other means for feeding performed strips, means for continuously forming the flexible strips such as an extruder for extruding a flexible strip, a spin bonding device, a weaving device, of the like.

An optional step in the manufacturing process is perforating the conduit product such that fluids may flow into or out of the conduit. A perforating means 700 forms apertures in the conduit base or top wall. In the preferred embodiment, the perforating means includes a base perforator 702 and a top wall perforator or vent trimmer 750. The base perforator includes a cutting means which cuts slits or slots in the flexible strips as they are fed continuously to the attaching means. Alternately, the base perforator may form the aperatures in the base after it is attached to the top wall. If the flexible strips are preperforated, woven, or otherwise porous, cutting slits in the base may be omitted. The top wall perforator 750 forms apertures in the top wall or, more particular to the preferred embodiment, in the apex area of the top wall between the two side walls. As the top wall is conveyed continuous therepast, the preferred top wall perforator severs projections which are molded into the apex area by the molding apparatus 60. Alternately, the perforating means may including slotting saws, drilling apparatus, or the like.

With continued reference to FIG. 2, another step in the manufacturing process is pulling the conduit product including the top wall substantially continuously through the splitting, feeding, and attaching steps. Because the tubular structure 62 is relatively soft as it leaves the continuous molding means, it is not well suited to being pushed through the slitting and attaching means. A pulling means 800 pulls the conduit product to move the tubular structure and top walls through the slitting means and the attaching means. In the preferred embodiment, the pulling means 800 pulls the front and rear conduit products at the same speed. Optionally, the front and rear conduit products may have their top wall corrugations elongated or foreshortened by changing the pulling speeds. Alternately, the pulling means may be located in part or in full between the splitting and attaching means, between the coupling and the splitting means, or the like.

Another step in the manufacturing process is cutting the conduit product into lengths. A cutting means 900 is selectively actuable to sever lengths of the conduit product. The cutting means, in the preferred embodiment, severs the conduit product automatically in response to a predetermined length being measured by a length measuring means 950. Preferrably, the cutting means 900 is independently actuable to cut the front and rear conduit products to different lengths.

Another step in the manufacturing process is winding the conduit product onto reels. When the conduit product is wound in its folded state, a mile or more of continuous conduit product may be wound on a single reel. A winding apparatus 1000 winds the front and rear conduct products into reels.

On occasion, some of the conduit product which is manufactured is of unacceptable quality or appearance. When it is discovered that an unacceptable product is being produced, the conduit product is cut between acceptable and unacceptable portions. The conduit product is diverted to the side until acceptable product is again produced. It is desirable for each reel to contain a continuous length of the conduit product. Accordingly, the conduit product produced before the first cut and after the second cut are connected together. The discarded, unaccepted product produced between the two cuts may be shreaded and refed to the extruder 50, used in other plastic molding operations, or the like. A conduit connecting means 1100 is disposed generally between the front and rear conduit product winding apparati for selectively connecting portions of the front and rear conduit products as may be appropriate. Preferrably, a single connecting means is provided. In the preffered embodiment, the conduit top walls to be connected are overlapped, mechanical fasteners are inserted through the lapped flanges, and the flexible base strips are taped together. Alternately, the connecting means may use adhesives, heat sealing, sewing, stapling, insertion of a fitting, or the like.

With particular reference to FIGS. 3 and 4 and continuing reference to FIG. 2, the splitting means 100 includes two pair of guide rails 102, 104, 106 and 108 which extend upstream to engage the flange portions 30 and 32 of the interconnected top walls of the tubular structure 62. A pair of inner guide rods 110 and 112 engage the interior of the tubular structure adjacent its top wall base ends to hold the flange portions between the guide rails. Optionally, side guide rods (not shown) may engage the top walls adjacent the apex areas to constrain the tubular structure more precisely to a preselected orientation and position. The upstream guide rails guide the tubular structure through the splitting means. The splitting means includes an upper or first splitting blade 120 and a lower or second splitting blade 122. The splitting blades are disposed centrally between the guide rails and perpendicular to the tubular structure to split the top wall base ends, more particularly the claw portions 34, 36' and 36, 34' apart. The splitting blades 120 and 122 extend through slots in portions of a slitting means frame 130 such that they can be removed for replacement. The splitting blades 120 and 122 are held in mounting pieces 140 and 142, respectively, which are connected with the splitting means frame structure 130 by a quick release connectors 144 and 146, respectively.

Disposed adjacent and downstream from the splitting blades 120 and 122 are a pair of dividers 150 and 152. The dividers 150 and 152 have relatively sharp upstream edges 154 and 156, respectively, and divergent downstream portions 158 and 160, respectively. Each divider separates the flange portions of the two top wall after they have been split by the splitting blades 120 and 122. The upstream edges 154 and 156 are sufficiently sharp, that they are able to split the claw portions of the connected top walls when the splitting blades 120 and 122 are removed. This enables worn splitting blades to be removed and replaced with new splitting baldes without interrupting the continuous movement of the tubular structure through the splitting means. The method for replacing the splitting blade, includes removing the worn blade, allowing the corresponding upstream divider edge to split the claw portions of the top walls apart, and inserting a new blade which again assumes the function of splitting the tubular structure. Because polyethylene and other plastics are relatively abrasive, the splitting blades 120 and 122, need to be replaced frequently, often more than once per shift. Although the dividers 150 and 152 could perform the splitting function without the blades, their upstream edges 154 and 156 would soon become dull and need replacement.

With particular reference to FIGS. 5 and 6 and continuing reference to FIG. 2, the bead applying means 202 of the attaching means 200 includes a hopper 204 for receiving pellets of a plastic material, an extruder 206 for plasticizing the plastic, and a manifold 208 for channelling the extruded plastic to a plurality of applicators, including applicators 210 and 212. The number of applicators is chosen to match the number of top wall base ends to which a flexible base is to be attached, four in the preferred embodiment. The manifold 208 includes a central channel 220 which receives a flow of plastic material from the extruder 206, a first transverse channel 222 which divides the flow of plastic in half, and secondary transverse channels 224 and 226 divide the flow among four flow paths which connected with the four applicators. The applicator 212 is illustrated and explained in detail and it is to be appreciated that the explanation applies equally to the other applicators. The applicator 212 has a internal bore 230 which receives softened plastic material under pressure from the manifold 208. The internal bore 230 conveys the molten plastic to a small diameter outlet aperture 232. The rate at which the plastic is expelled through the outlet aperture 232 is controlled by the pressure and temperature of the plastic, as well as the diameter of the outlet aperture 232.

A first control thermocouple 240 and a second control thermocouple 242 monitor the temperature of the plastic in the applicator 212. The first control thermocouple 240 monitors the temperature of the applicator 212 and the second temperature control thermocouple 242 monitors the temperature of the plastic material in the internal bore 230 directly. A heating means 250 is provided adjacent the outlet aperture 232 and closely adjacent and parallel to a portion of the internal bore 230 to maintain the temperature of the plastic material at the outlet bore 232 accurately at a predetermined temperature. By controlling the temperature of the plastic in each of the applicators, each applicator can be caused to apply a bead of sealing material, at the same rate. In the preferred embodiment the plastic is polyethylene which the applicator heaters maintain at 470° F.

Figure 8:
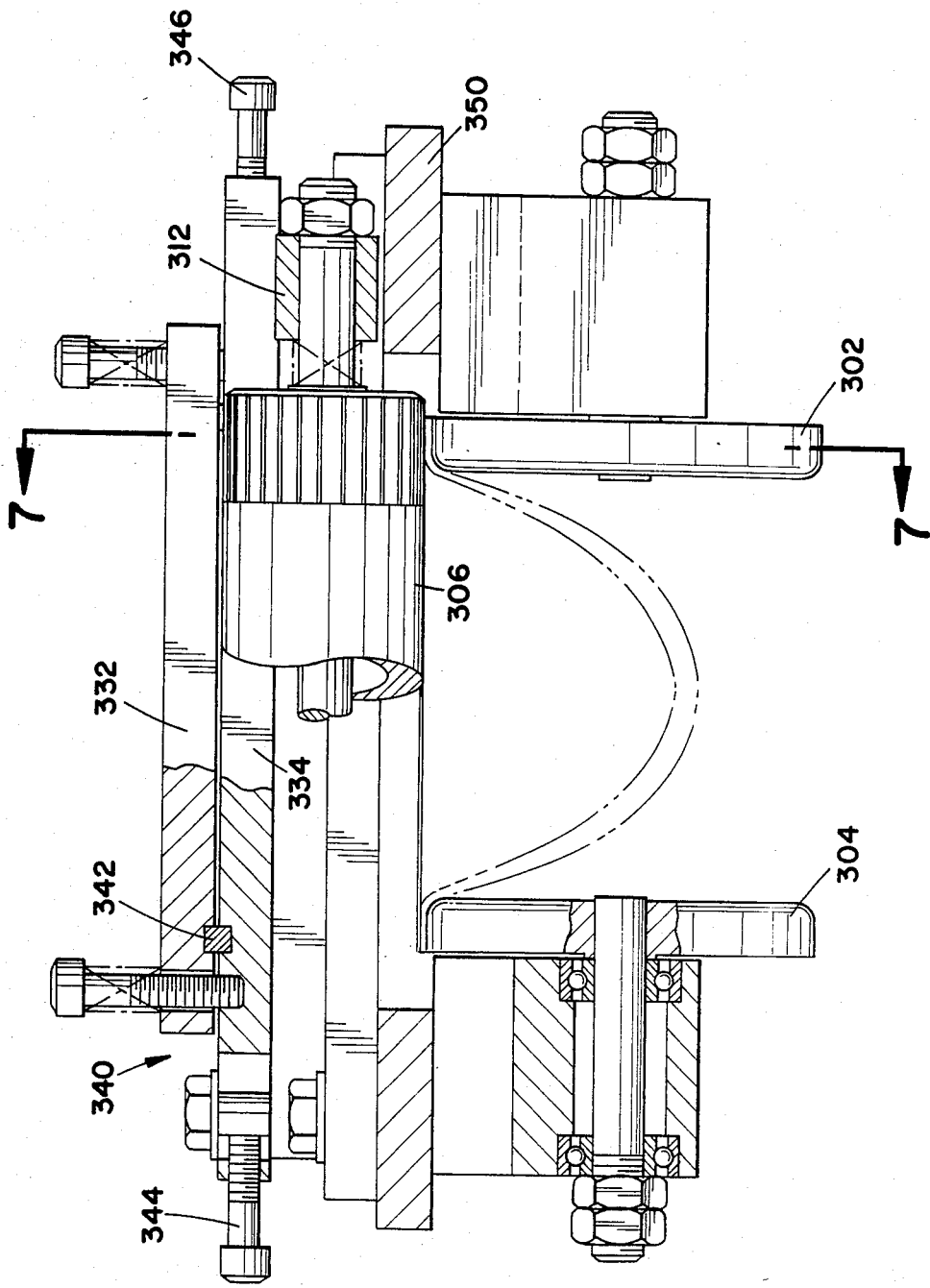

In the preferred embodiment, the top walls are reoriented after leaving the splitting means such that they are disposed next to each other, front and rear, with their base ends facing upward. This allows the softened plastic beads to fall by gravity into the top walls adjacent the base ends, preferrably along the under side of the flanges 22 and 24. With particular reference to FIGS. 7 and 8 and continuing reference to FIG. 2, the attaching means 200 includes a guide means for guiding the top walls with their base ends upward. The guide means includes four guide rails with brass facing surfaces, note rail 260 in FIG. 7. The guide rails extend below each of the polyethylene bead applicators to support the conduit product by its flanges as it receives a bead of polyethylene.

With continuing reference to FIGS. 2, 7, and 8, the pressing means 300 continuously receives the top walls with the attaching beads applied and the flexible strips and presses the flexible strips against the attaching bead and the top wall. The pressing means includes a plurality of lower pressing wheels, including front pressing wheels 302 and 304, in alignment with each of the guide rails to support the top wall flanges. A pair of pressing rollers, including a front pressing roller 306, are disposed adjacent the pressing wheels such that the top wall flanges pass therebetween.

The flexible base strips are fed around the pressing rollers into contact with the attaching beads. The pressing rollers are located sufficiently close to the applicators 210, 212, et al. that the bead of polyethylene is still sufficiently warm that it fuses with the flexible strip and with the flange portions during pressing. To allow the softened plastic bead to retain its heat longer to form a deeper bond, the pressing rollers have a pattern for forming pockets of the softened plastic material. Specifically, the pressing rollers include a plurality of ribs extending generally transverse to the guide rails such that the heat softened base material is given a rippled, generally a pie crust-like appearance. Further, under this heat, the flexible material tends to soften and deform slightly. This pie crust-like pattern not only creates pockets of the softened plastic material, but also prevents the heat deformation of the flexible strip from detracting from the appearance of the product, the flexible strip and top walls from becoming misaligned by uneven deformation, or the like. In this manner, a melting or softening of the flexible material upon contact with the polyethylene bead is caused to occur with regularity maintaining the film in accurate alignment with the top wall flanges.

A pressing pressure adjusting means 310 is provided for adjusting the pressure between the pressing rollers and the pressing wheels. The pressure adjusting means for pressing roller 306 includes a connecting link 312 which connects the axis of the pressing roller 306 with a pivot 314. Disposed between the pivot and the roller axis is a threaded shaft 316 on which a threaded member 318 rides. Disposed between the threaded member 318 and the pivot link 312 is a spring means, specifically a stack of spring washers 320. To adjust the pressure between the pressing roller and wheels the threaded member 318 is rotated to adjust the compression of the spring means 320 between the threaded member 316 and the pivotal link 312.

The flexible strip is received from the feeding means at a guide roller 328 and a locating means 330. The locating means includes an upper plate 332 and a lower plate 334 between which the flexible strip passes. The locating means includes pressure adjusting means including a plurality of biasing springs 336 and set screws 338 for adjusting the relative pressure which the springs apply to the upper plate 332. More specifically, the pressure adjusting set screws set the angle of the upper plate relative to the lower plate such that the interplate gap is wider at the upstream side and set the amount of force required to alter the relationship between the upper and lower plates. This allows a thicker splice in the flexible strip to spread the upper and lower plates as it passes through. A centering means 340 is adjustable to position the flexible strip in accurate alignment with the top wall flange portions. The centering means includes a pair of edge blocks, including edge block 342, between the plates for positioning the edges of the strip. A pair of positioning screws 344 and 346 selectively adjust the position of the lower plate 334 and the edge blocks.

To facilitate threading the top walls through the attaching means 200, the pressing roller 306, tensioning means 330, and the guide roller 328 are disposed on a removable top plate 350. A quick release means including a pair of quick release clamp assemblies 352 and 354 selectively clamp or release the plate 350 and associated structures from adjacent the guide rails 260 et al. To assure that the removable plate 350 is positioned accurately and precisely relative to the guide rails, a plurality of alignment pins, including pin 356, are fixedly mounted in the guide rail and a matching plurality of a hardened bushings, including bushing 358, are mounted in the removable plate 350.

The pressing means 300 includes another set of pressing rollers, pressing wheels, tensioning means, and centering means, all of the same construction but not shown, connected with the removable plate for pressing the other of the front and rear flexible sheets and top walls together.

Figure 9:
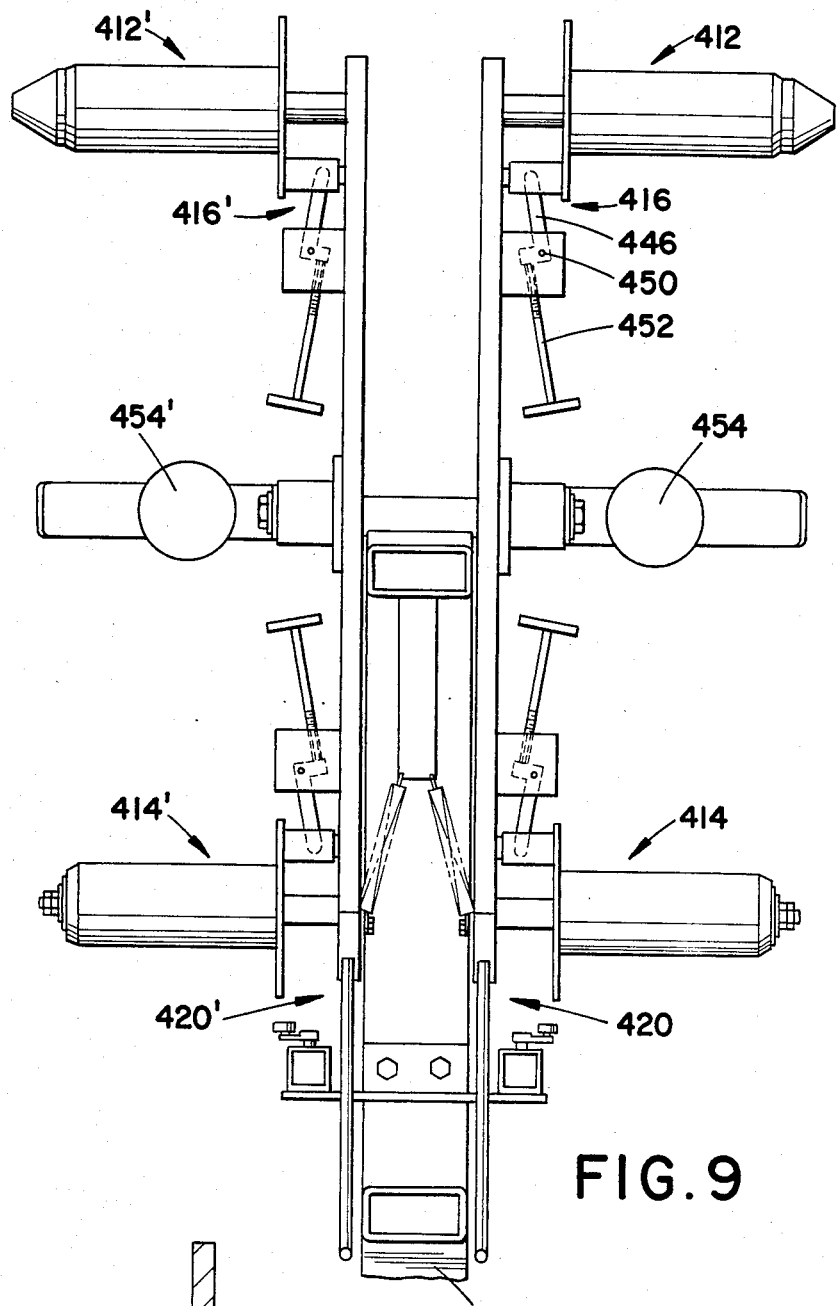
FIGS. 9 and 9A are further illustrative of a take-off stand of the flexible strip feeding means illustrated in the block diagram of FIG. 2.

As the top walls are being conveyed continuously to the attaching means 200, the feeding means 400 feeds substantially continuous flexible strips to the attaching means. The feeding means 400 includes a take-off stand 402, a splicing means 500, and an accumulator means 600. With particular reference to FIG. 9 and continuing reference to FIG. 2, the take-off stand 402 includes a central support 404 which rests on its lower end on the floor. At the upper end of the stationary support 404 is a horizontally disposed spindle 406 which projects to the front and rear of the stationary support. Rotatably mounted on the front end of the spindle 406 is a first rotatable support structure, more specifically a first rotatable arm 410 on which a first spindle 412 and a second spindle 414 are rotatably mounted. The first spindle 412 holds an operating or first roll of the flexible base material to be fed to the attaching means and the second spindle 414 holds a back up or second roll of the flexible material. To control the rotational movement of the first spindle, a first brake means 416 is provided and to control the rotation of the second spindle, a second brake means 418 is provided. A first rotatable arm positioning means 420 selectively holds one of the first and second spindles up and the other down. Rotatably mounted on the rear end of the shaft 406 is a rear or second rotatable arm 410' on which a third spindle 412' and a fourth 414' are rotatably mounted. Brake means 416' and 418' control the rotation of the third and fourth spindles, respectively. A second rotatable arm positioning means 420' selectively holds the second arm 410' with one of the third and fourth spindles up and the other down. This allows the back up roll to be rotated into the position of the operating roll after a splice has been made and the back up roll becomes the operating roll. A core or the like from the presplice operating roll is removed from the spindle and a new back up roll is placed on it. In this manner, as the operating roll runs out, the back up roll is spliced with it, the back up roll is moved to the operating roll position and a new back up roll mounted on the take-off stand.

Figure 9A:
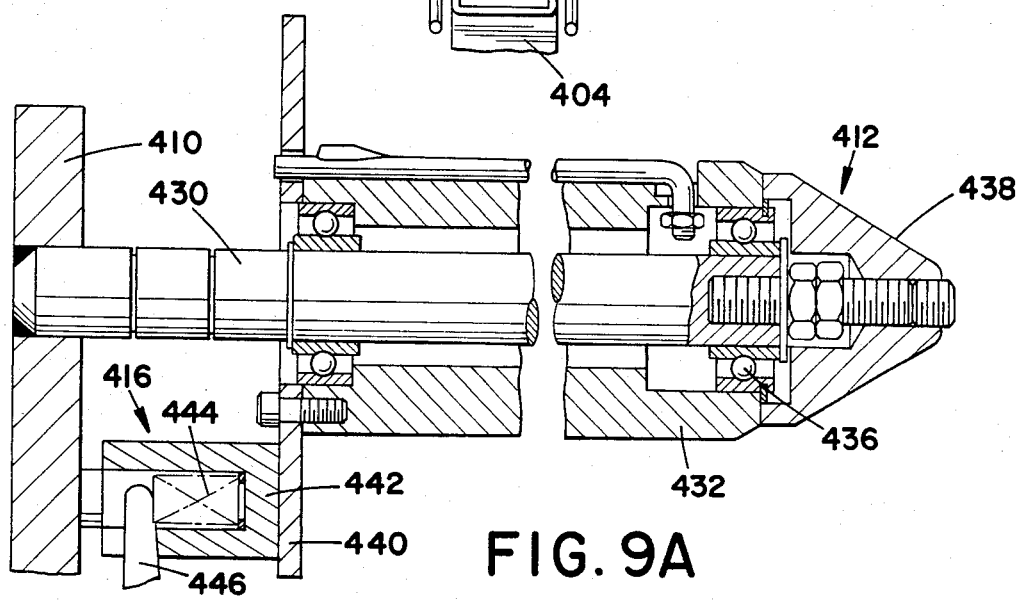

With reference to FIG. 9A, details of the spindle 412 and portions of the brake means 416 are illustrated to show the construction of all four spindle and brake means. The spindle includes a shaft 430 on which a spindle sleeve 432 is mounted by bearings 434 and 436. A tapered cone 438 guides rolls on to the spindle sleeve. A spindle flange 440 is connected to the spindle sleeve for rotation therewith. The brake means 416 includes a brake element 442 which is urged into frictional engagement with the flange 440 by a brake spring 444. The compression of the brake spring, hence the frictional force between the brake element and the spindle flange, is adjusted by a lever 446 which selectively compresses the brake spring 444. The lever is pivotally mounted to the first rotatable arm 410 by a pivot 450. A set screw 452 acts against the opposite end of the lever 446 to adjust the braking force.

With particular reference to FIG. 2, the take-off stand has an elongated arm 460 extending horizontally therefrom toward the splicing means 500. Mounted on the elongated arm 460 is a first light source and detector combination 462 for detecting a trailing end of the front operating roll and a second detecting means 462' for detecting the trailing end of the rear operating roll. A first reflector 464 is non-rotatably mounted on the shaft 406 such that it reflects light from the first light source back to the first light detector. The first light source and light detector and first reflector are positioned such that the strip of flexible material from the first or front operating roll passes therebetween causing the light detector to be blocked from receiving light. When the trailing end of a first operating roll passes the detection means, the light detector starts detecting light from the source and indicates that the trailing end has been detected. Similiarly, a second reflector 464' is mounted on the rear portion of the shaft 406 such that it reflects light from the second light source back to the second light detector. The flexible strips from the back up rolls extending to the splicing means 500 pass below the light source, light detector, and reflector such that the presence of the back up roll does not interfere with the detection of the trailing end of the operating roll. When the back up roll is rotated to the position of the operating roll by rotating the rotatable arm 410 by 180°, the flexible strip from that roll passes through the detection means such that its trailing end is detected.

Figure 10:
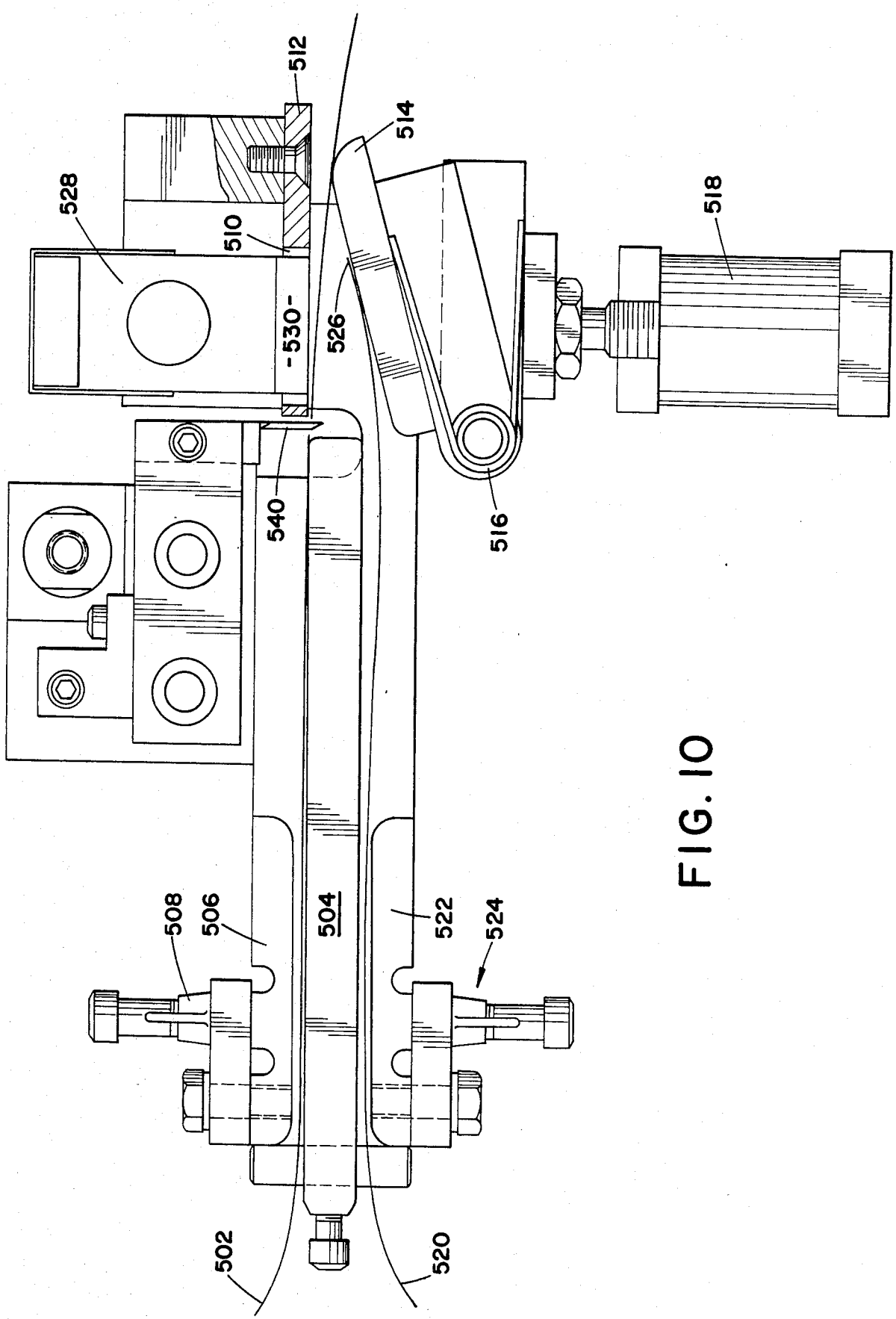
FIG. 10 is further illustrative of a splicer of the strip feeding means illustrated in block diagram of FIG. 2.

With particular reference to FIG. 10 and continuing reference to FIG. 2, the splicing means 500 receives a first or operating flexible strip 502 in a first guide path defined by a movable guide plate 504 and an upper plate 506. A threaded adjustment means 508 selectively cams or flexes the upper plate 506 toward the movable plate 504 to adjust the tension on the operating flexible strip. The operating strip passes through the splicing means running along a grill-like guide slots or means 510 in a stripper plate 512. Disposed below the stripper plate 512 is a pressing plate 514 which is biased at an angle by a spring 516. A pneumatic cylinder 518 selectively moves the pressing plate 514 into engagement with the stripper plate 512 and the grid-like guide means 510. Because the pressing plate spring 516 holds the pressing plate 514 at an angle, the pressing plate engages the operating flexible strip betwen itself and the stripper plate 512 with a progressively increasing drag. This inhibits the flexible strip from being ripped.

A back up or second flexible strip 520 is fed along a second guide path between the lower side of the movable plate 504 and a lower tensioning plate 522. A second tension adjustment 524 is provided for the lower tensioning plate 522 to select the tension on the back up flexible strip after it is spliced to the operating strip and functions as the operating strip. The back up strip is positioned by hand and its leading end 526 laid on top of the pressing plate 514 about mid-way along its length about level with the outlet end of the guide slots 510 of the stripper plate. When the trailing end of the operating strip is sensed, pneumatic cylinder 518 is actuated to lift the pressing plate 514 into firm engagement with the stripper plate 512 adjacent the guide slots 510. This places the operating strip and the back up strip in a layered configuration between the pressing plate 514 and the stripper plate. A second pneumatic cylinder, not shown, causes a heater 528 with a plurality of downward extending ribs 530 to move its heated ribs 530 through the stripper plate slots 510 and into engagement with the operating strip. The heated ribs soften the operating strip and the back up strip fusing them together. Alternately, the stripper plate may be spring biased with its guide slots 510 spaced from the heating means such that the pneumatic cylinder 518 moves the first and second strips and the stripper plate upward until the heating means is contacted. A knife blade 540 is caused to traverse across the operating strip severing it between the splice and its trailing end.

The splicing operation complete, the pneumatic cylinders withdraw allowing the back up strip to be drawn continuously through the splicing means. The operator manually removes movable plate 504 and rotates the arm 410 or 410' of the stand 400 moving the back up roll to the upper, operating roll position making it the operating roll. The movable plate 504 is repositioned below the strip moving the strip to the operating strip guide path. A new back up roll is positioned on the stand and its leading end is threaded through the back up strip guide path between the movable plate 504 and the lower tensioning plate 522. The leading end of the new back up strip is positioned on the pressing plate 514 to be spliced adjacent the trailing end of the new operating strip. The splicing means includes a second splicing mechanism, not shown, identical to the above described structure for splicing the operating and back up strips of the other of the front and rear strip feeding means.

During the splicing operation, it is desirable for the attaching operation to continue. To enable the attaching operation to continue receiving the flexible strip while it is held stationary for splicing, a reserve of the flexible strip is accumulated and played out during splicing operation.

Figures 11, 12:
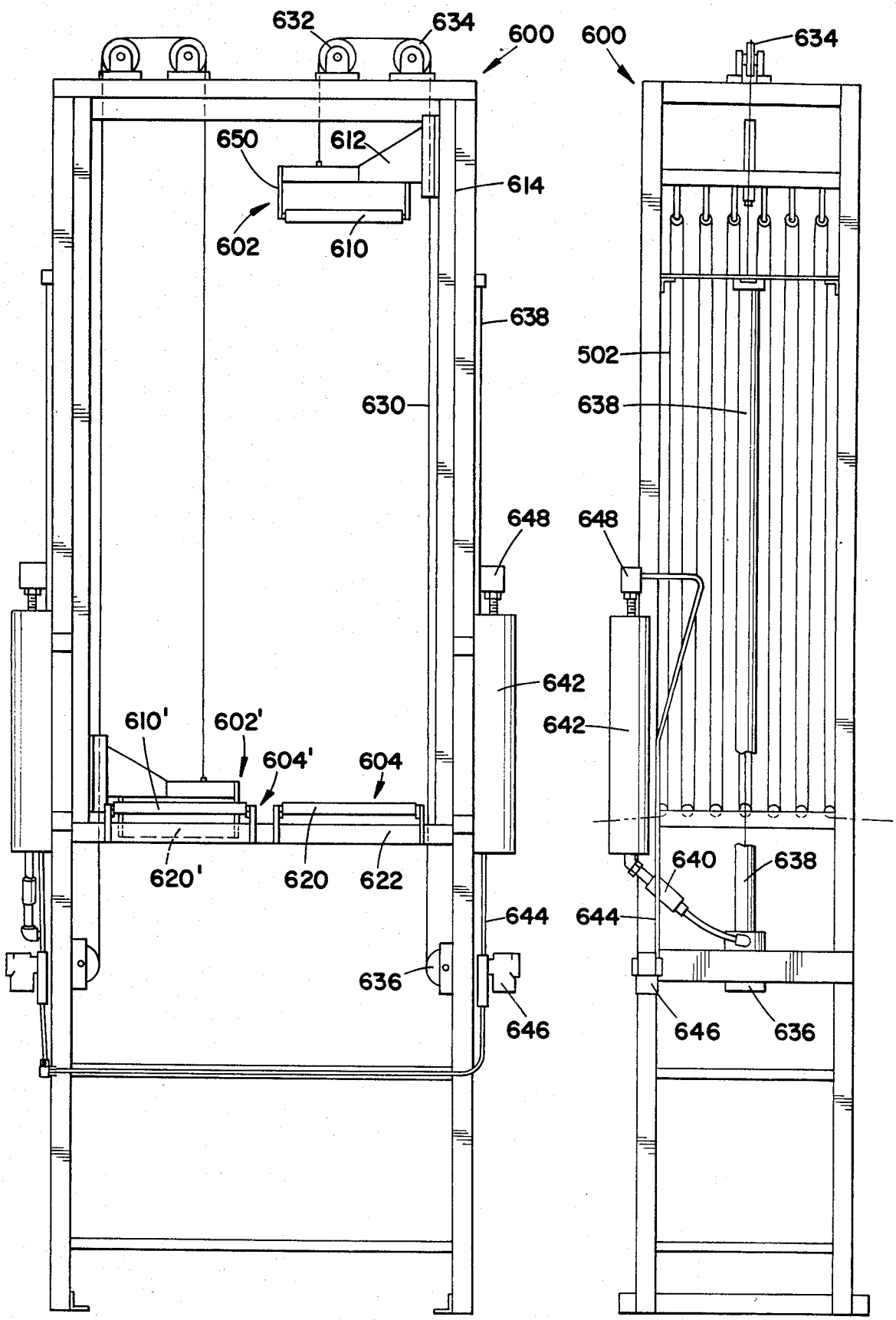
FIGS. 11 and 12 are further illustrative of an accumulator of the strip feeding means illustrated in the block diagram of FIG. 2.

With particular reference to FIGS. 11 and 12 and continuing reference to FIG. 2, the accumulator means 600 accumulates the flexible strip when it is being conveyed through the splicing means and plays it out during a splicing operation. The accumulator means 600 includes a first or upper front guide set 602, a first or upper rear guide set 602', a second or lower front guide set 604, and a second or lower rear guide set 604'. The flexible strips are fed alternately between respective upper and lower guide sets along a generally zig zag path. The first or upper front guide set 602 includes a plurality of rollers, including roller 610, which are connected with a bracket 612. The bracket 612 is slidably disposed in a verticle track 614. The lower guide set includes a plurality of rollers, including roller 620, which are stationarily mounted on an accumulator frame portion 622.

The first and second guide sets are biased apart by a biasing means which urges the bracket 612 towards its upward position. The biasing means includes a cable 630 extending from the upper guide set bracket 610 over an upper roller 632 and 634 and a lower roller 636 and into a fluid cylinder 638. In the fluid cylinder, the cable 630 is connected with a piston (not shown) that is biased upward in the fluid cylinder by fluid under pressure. The fluid cylinder, preferrably a hydraulic cylinder, is connected through a flow control means 640 with a hydraulic reservoir 642. The hydraulic reservoir is connected by a pneumatic line 644 and and air valve 646 with a pressurizing means, such as a source of pressurized air, to provide biasing pressure to the hydraulic fluid in the hydraulic reservoir 642. A quick exhaust 648 valve selectively releases the pressure in the hydraulic reservoir as required. When the flexible strip is moving freely through the splicing means, the air valve 646 causes a head of pressure to be applied to the hydraulic reservoir 642. The pressure head causes the hydraulic fluid in the fluid cylinder 638 to bias the upper roller set to its upper position. When the splicer starts a splicing operation, the exhaust valve 648 is opened, venting the pressure in the hydraulic reservoir 642. This reduces the pressure in the hydraulic cylinder 638 allowing the upper rollers to move downward toward the lower rollers at a rate determined by the flow control means 640. When the splice is completed, the air valve 646 is opened allowing the hydraulic reservoir 642 to be repressurized. This again biases the upper and lower roller sets apart.

The upper rollers are connected with the bracket 612 by relatively elongated arms, e.g. arm 650, which are longer in length than the diameter of the lower rollers. When the accumulators is to be threaded with the flexible strip to initiate operations, the upper bracket is lowered fully as illustrated by the rear upper bracket 602'. This places the upper rollers, note upper roller 610', below the lower rollers, note lower roller 620'. This allows the flexible strip to be passed horizontally and linearly between the upper and lower roller sets. Raising the upper rollers threads the flexible strip into the zig zag path. In this manner, initial threading of the accumulator is simplified and facilitated.

If the conduit is to be used for drainage or leach bed purposes, it is desirable to perforate or to cut apertures into the base material strip or top wall to allow fluids to flow into and out of the conduit. If the flexible strips are porous or preperforated, the flexible strip may be attached directly to the top walls. However, if the flexible strips are imperforate, they may be perforated online as a part of the feeding operation.

Figure 13:
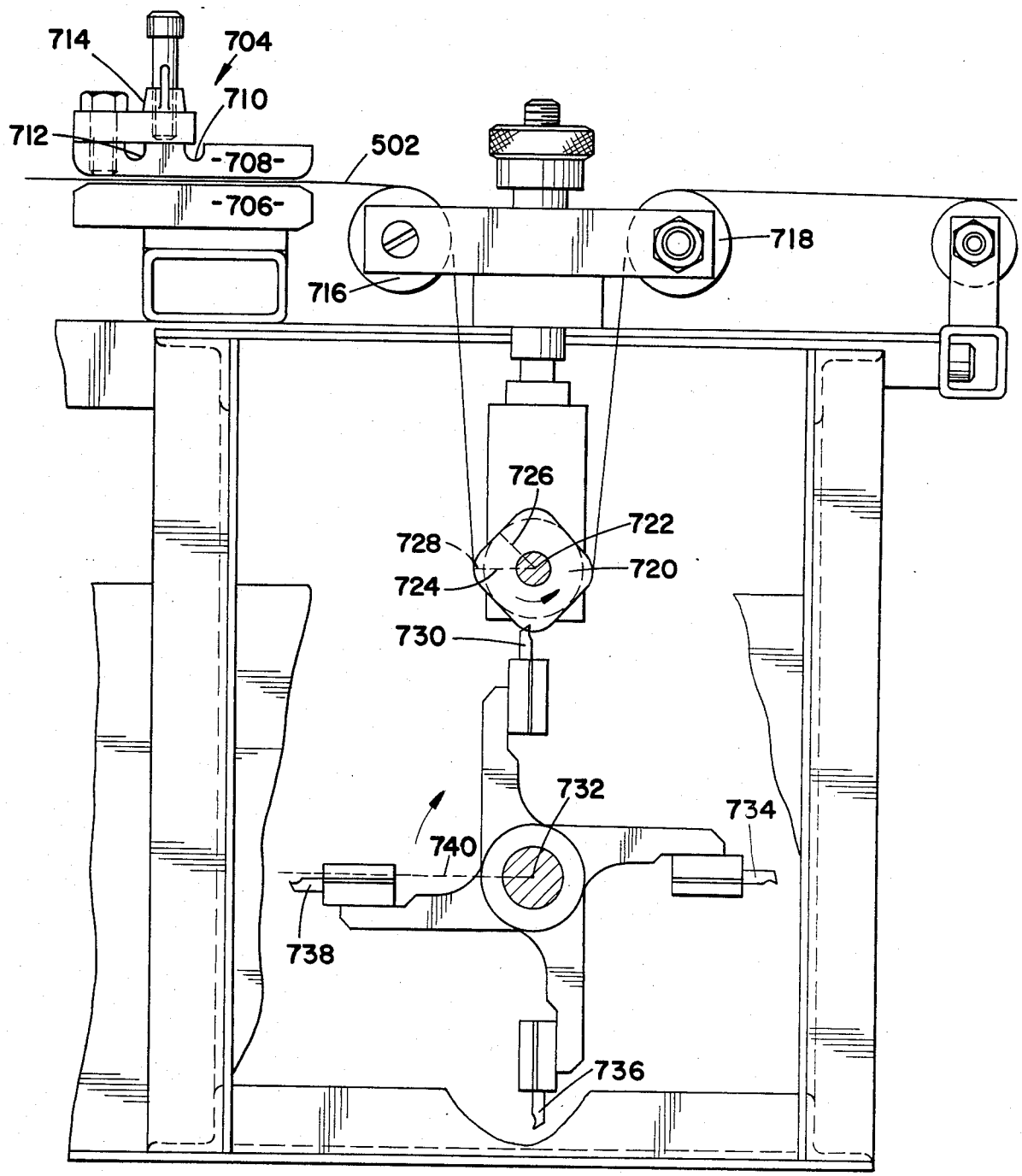
FIG. 13 is further illustrative of a continuous flexible strip perforating means illustrated in the block diagram of FIG. 2.

With particular reference to FIG. 13 and continuing reference to FIG. 2, the flexible strip perforating means 702 has a tension adjusting means 704 which receives the front operating flexible strip 502 from the accumulator means 600. The tension adjusting means 704 has a stationary tensioning plate 706 and a flexible tensioning plate 708. To increase the flexibility, the flexible plate has a pair of arcuate flex recesses 710 and 712. A tension adjusting member 714 selectively cams flexible tensioning plate 708 between the flex recesses toward or away from the stationary tensioning plate 706. This adjusts the tension of the flexible strip passing therebetween. The flexible strip is conveyed from the tensioning means 704 to a first guide roller 716 and a second guide roller 718 which guide the flexible strip in a loop around a perforating roller 720. The perforating roller is mounted for rotation about a longitudinal axis 722. The perforating roller has at least one longitudinally extending major radius portion disposed a major radius 724 from the roller axis 722 and at least one minor radius portion disposed a minor radius 726 from the roller axis. The major radius is greater than the minor radius. Preferrably, the perforating roller has a rectilinear cross section with the corners being the major radius portions and midway between the corners being the minor radius portions. In the preferred embodiment, the perforating roller has a square cross section with rounded corners. Disposed in circumferential alignment in each of the corner portions are plurality of longitudinally spaced tangential slots 728. The slots are defined at each corner by the difference between the major and minor radii.

A first plurality of longitudinally aligned cutting blades 730 are disposed in alignment with and pass through the slots 728. The cutting blades are rotatably mounted for revolution about a cutting blade axis 732 which is parallel to the perforating roller axis 722. In the preferred embodiment, a second, third and fourth plurality of blades 734, 736, and 738 are disposed co-planar with each of the first plurality of blades 730 and the tangential slots 728. The blades are displaced from the cutting blade axis 732 by a cutting blade radius 740 which intersects the major radius 724 but not the minor radius 726. In this manner, portions of the flexible strip carried by the roller corner portions intersect and are cut by the blades and flexible strip portions between the corners do not intersect the blade radius and remain imperforated. In the preferred embodiment, the cutting blades are rotated in the same direction as the perforating roller at a much higher speed such that two or three blades cut through the flexible strip at each perforating roller corner. Further, to the preferred embodiment, the roller 720 is constructed of a solid square plastic rod which is rotatably mounted along the roller axis on end bearings. The square rod is turned on the lathe to cut a plurality of circular slots and round the corners. The perforating means 700 includes a like flexible strip perforating means, not shown, for perforating the other of the front and rear flexible strips.

With particular reference to FIGS. 7 and 14 and continuing reference to FIG. 2, the perforating step in the preferred manufacturing process includes perforating or venting the top wall at its apex area. The top wall perforating step may be performed at any time after the blow molding step. The apex area of each top wall is molded with a plurality of projections or bubbles 752 which project outward therefrom. The top wall perforating step is performed by severing each projections to leave an aperture in its stead. The top wall perforating or venting means 750 includes a severing means 754 for cutting the projections from the apex area to provide apertures in the top wall. This severing means includes a blade 756 disposed tangentially to the top wall apex area. The blade has a notch 758 located centrally to receive and sever the projections. To insure that the projections are severed completely, a deflector 760 is provided for inhibiting the projections from rotating or flipping out of contact with the blade 756 after they are partially cut. The deflector is disposed a distance from the blade that is commensurate with the height of the projections. Thus, when a projection tries to tip, it impacts the deflector 760 and is prevented from rotating until it is fully severed. Directly below the blade 756, a surface 762 of the deflector which runs parallel to the path of travel of the top walls arcs away with an arcuate surface portion 764 to allow limited rotation of the projections to accomodate the width of the blade 756. An adjustable shoe 770 positions the blade 756 relative to the top wall apex. The shoe is adjusted such that the blade severs substantially the entire projection without cutting or scoring the apex area between the projections. An adjustable bias spring 772 biases the cutting blade 756 and the shoe 770 against the top wall apex area.

Figure 15:
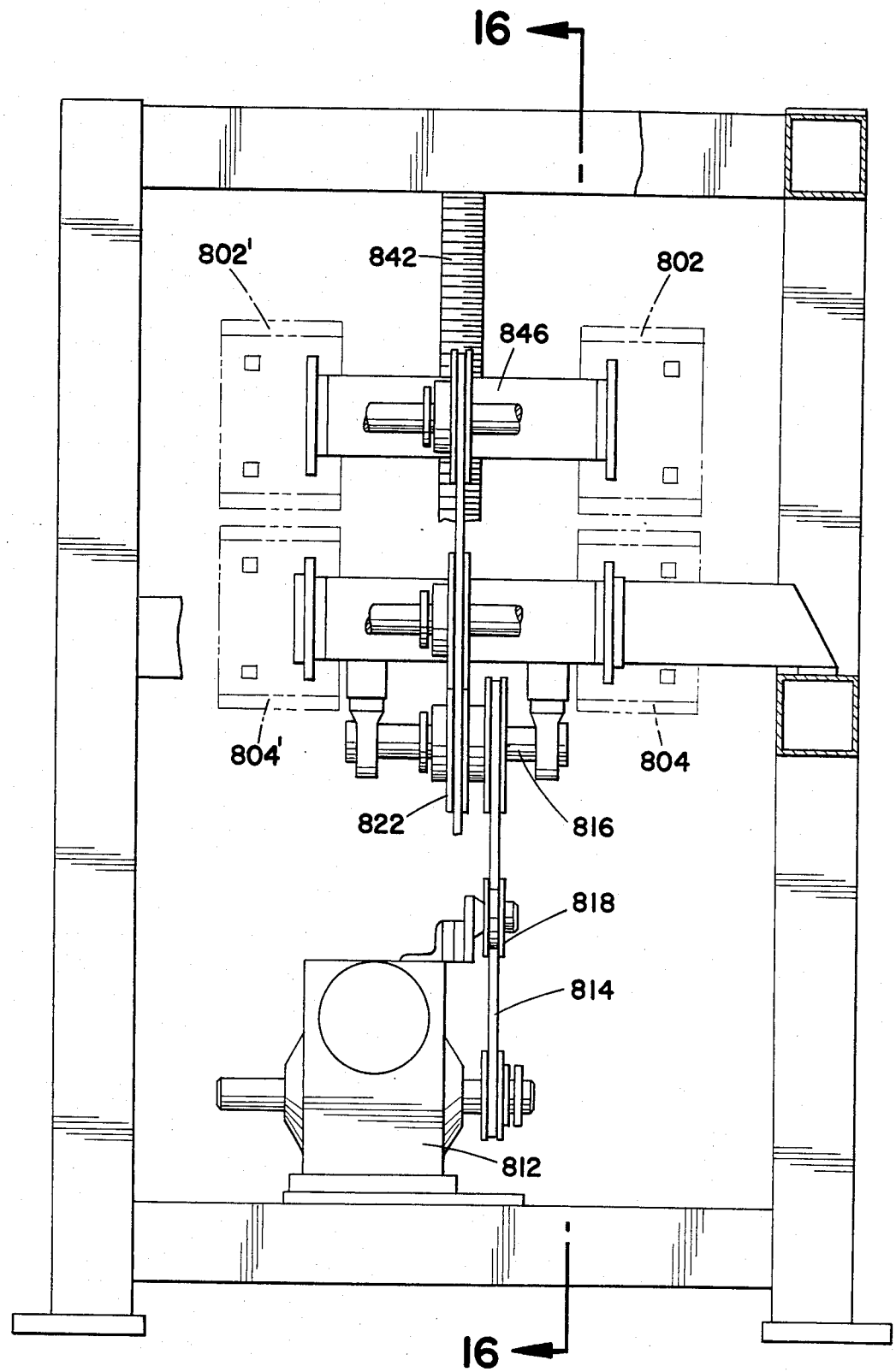
FIGS. 15 and 16 are further illustrative of a puller means of the block diagram of FIG. 2.
Figure 16:
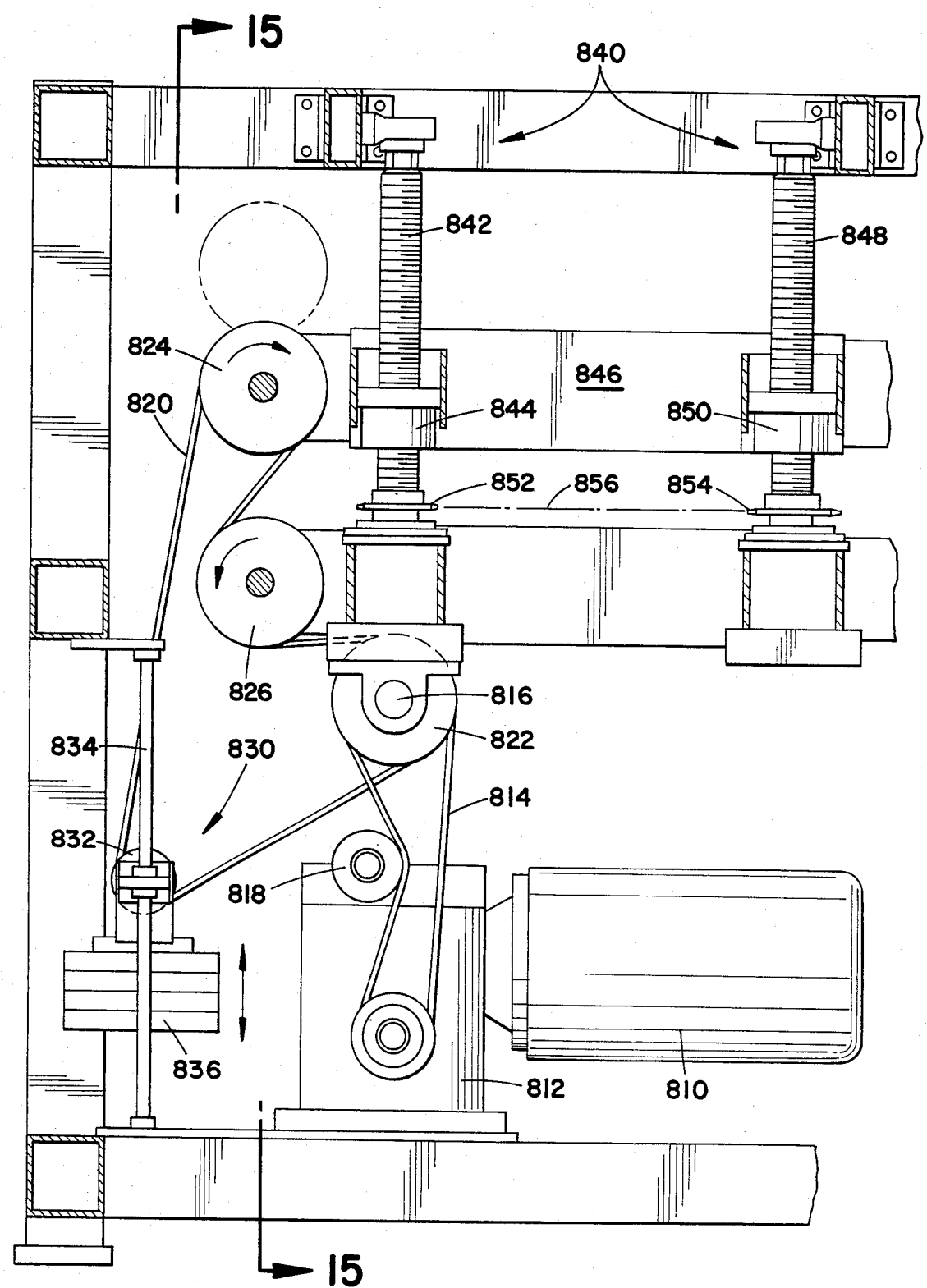

With particular reference to FIGS. 15 and 16 and continuing reference to FIG. 2, the pulling means 800 pulls the conduit through the cooling means 70, the splitting means 100, the attaching means 200, and the top wall perforating means 750, and pulls the flexible strips through the feeding means 400. The pulling means 800 includes a first or front pair of belts 802 and 804 which interact to pull one of the conduit products and a second or rear pair of belts 802' and 804' which interact to pull the other of the conduits products. Preferrably, the conduit products are placed between cooperating pairs of belts generally horizontally in their folded configuration. As the conduit leaves the guides rails 248 of the attaching means, the side walls start being drawn together and the flexible base falls by gravity between the side walls. The side walls pull closer together and rotate at 90° as they are drawn between the pairs of belts in the pulling means. The pulling means further includes a motor 810 for driving the pairs of belts and a gearbox 812 for converting the speed of the motor to appropriate speed for driving the belts. The gearbox 812 is connected by a chain 814 with a jackshaft 816 which is caused to be rotated by the motor, gearbox, and interconnecting chain. An idler sprocket 818 maintains the chain 814 in proper tension. A flexible drive 820 is driven by a drive wheel 822 which is mounted on the jackshaft 816. The flexible drive 820 passes over a first driven wheel 824 in a first, clockwise direction and around a second driven wheel 826 in the opposite, counterclockwise direction. Thus, the flexible drive 820 is wrapped around the drive wheels 824 and 826 in an "S-wrap" configuration. The driven wheels are connected with the upper belts of both pairs and the lower belt of both pairs to drive the belts within each pair in opposite directions at the same speed. A tension maintaining means 830 maintains the tension on the flexible drive 820 substantially constant. The tension maintaining means includes an idler wheel 832 which is slidably mounted on a guide rod 834. A biasing means is provided for biasing the idler wheel with a preselected amount of force which corresponds to a preselected tension. In the preferred embodiment, the guide rod is mounted generally vertically and the biasing means includes a weight 836 connected with the idler wheel 832 to bias it downward by gravity.

An adjusting means 840 is provided for raising the upper belts 802 and 802' relative to the lower belts 804 and 804' to facilitate feeding the conduit products therebetween and to adjust the frictional engagement with which the belts grab the folded conduit products. Too much pressure between the belts will crush or damage the conduit products, whereas too little pressure between the belts will allow slippage rendering the pulling action ineffective. This pressure adjusting means includes a downstream acme thread drive 842 which is rotatably received in a threaded bushing 844 on an upper support frame 846 and an upstream acme thread drive 848 which is received in a threaded bushing 850 on the upper frame 846. The acme thread drives are connected by sprockets 852 and 854 and interconnecting chain 856 such that both are adjusted in concert. The first or upper driven wheel 824 is mounted at one end of the upper support 846. In this manner, a run is formed between the upper and lower belts of each pair in which portions of both belts move linearly in the same direction at an adjustable spacing.

Figure 17:
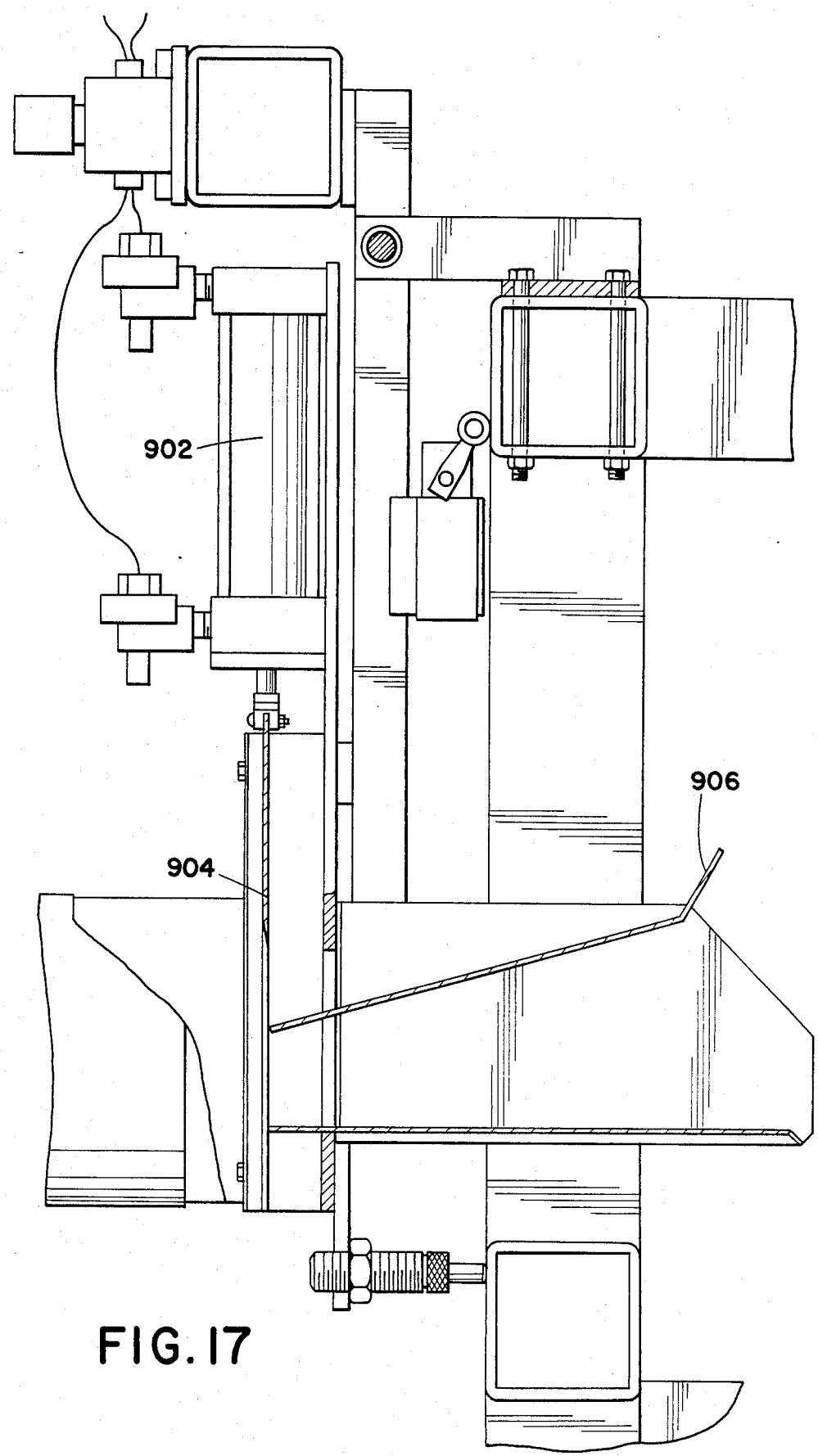
FIG. 17 is further illustrative of a cut off means of the block diagram of FIG. 2.

With particular reference to FIG. 17 and continuing reference to FIG. 2, the cut off means 900 includes a pneumatically operated cylinder 902 which is selectively actuated to drive a cutting blade 904 through the conduit product. The cut off means is disposed closely adjacent the downstream end of the pulling means 800 with a guide chute 906 disposed toward the pulling means. This enables the conduit product to continue feeding through the cut off means after each cut. The cut off means includes a second like pneumatic cylinder and cutting blade, not shown, for severing the other of the front and rear conduits.

Figure 18:
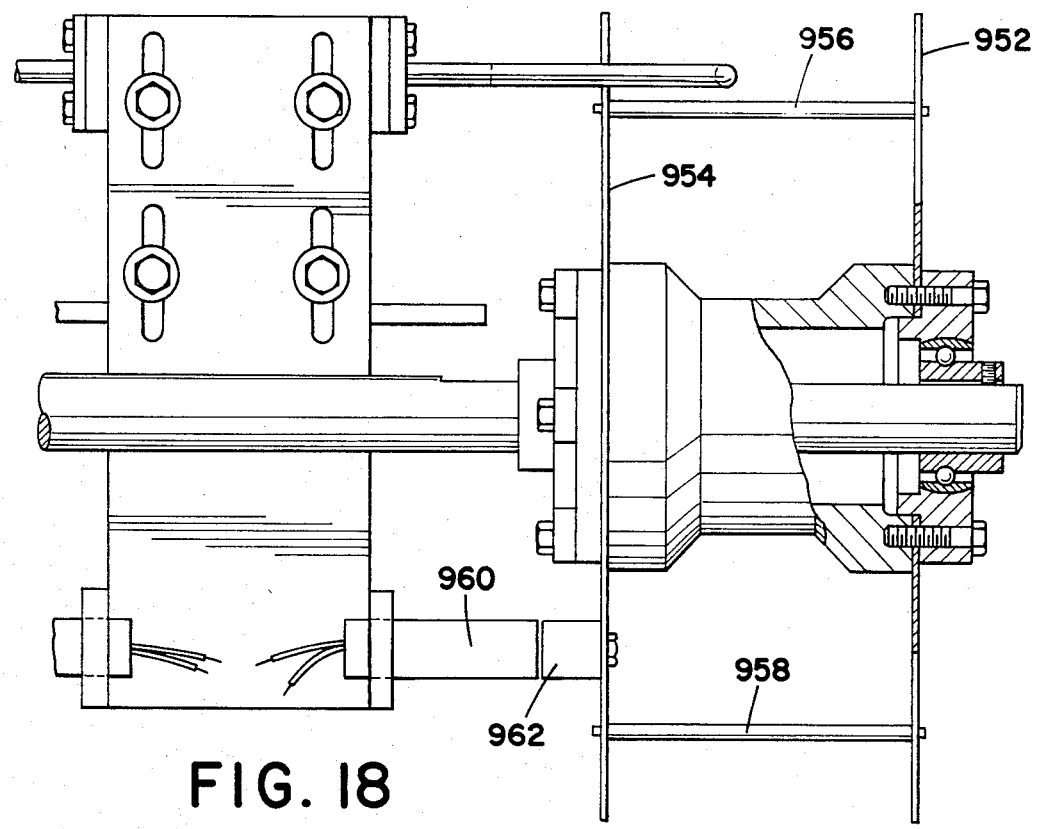
FIG. 18 is further illustrative of a count wheel of the block diagram of FIG. 2; and, FIG. 19 is further illustrative of rivet splicer of the block diagram of FIG. 2.

With particular reference to FIG. 18 and continuing reference to FIG. 2, the length measuring means 950 includes a counting wheel which is rotated by the corrugations in the conduit. The counting wheel includes a front disk 952 and a rear disk 954. A plurality of rods 956, 958 and others, not shown, are connected between the front disk 952 and the rear disk 954. The rods are spaced circumferentially around the disks with circumferential, interrod spacings which are an integral multiple of the distance between peaks and valleys in the conduit product side walls. This enables the rods to be engaged within the valleys of the corrugations causing the front and rear disks to be rotated by the conduit product as it passes the counting wheel. A revolution counter 960 interacts with a reference point 962 on the rear disk 954 to count the number of revolutions which the wheel makes. The reference point may include a magnet and the counter may be stopped by a reed switch each time the magnet passes. Because the number of revolutions is a measure of length, the count on the counter indicates the length of conduit product which has passed over the counter wheel and through the puller. Whenever the counter 960 reaches a preselected count, it causes the cut off means 900 to sever the length of conduit product and resets the counter. The length measuring means includes a like counting wheel assembly for measuring the length of the other of the front and rear conduit products.

Figure 19:
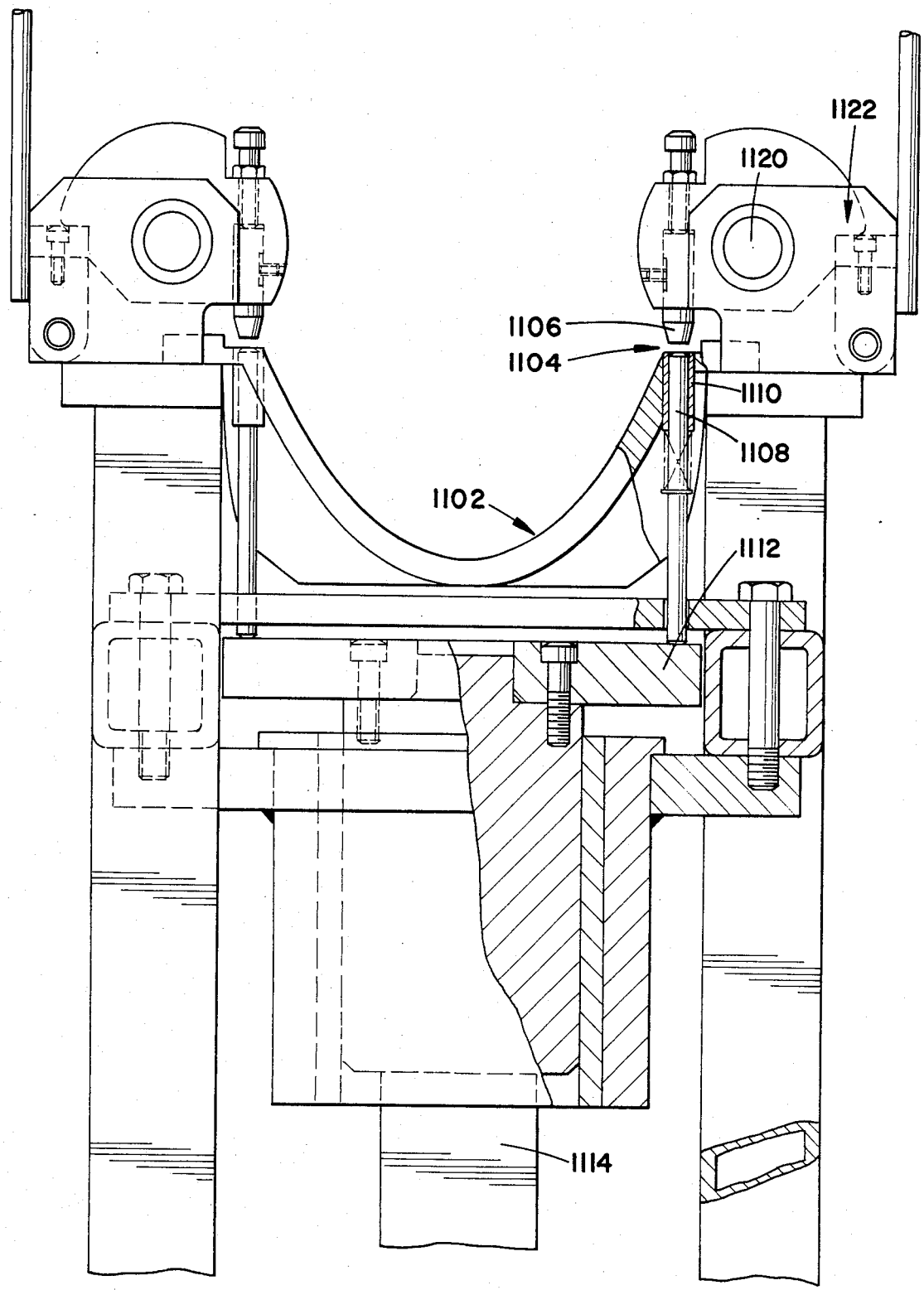

With particular reference to FIG. 19 and continuing reference to FIG. 2, the conduit connecting means 1100 in the preferred embodiment is a riveting apparatus for selectively riveting together sections of the front or rear conduit product. The riveting apparatus includes a receiving area 1102 for receiving two overlapped conduit top walls which are to be riveted together. The receiving area has a corrugated surface which matches the exterior surface of the top walls. Adjacent the receiving area 1102 is a means for inserting a mechanical fastener through the overlapped conduit top walls. The fastener inserting means includes a punch block 1104 on which the overlapped flanges of the two conduit products to be riveted are placed. At least one anvil 1106 is positioned to one side of the flanges and a punch shaft 1108 to the other. The punch shaft 1108 is slidingly received in a bushing 1110 which is disposed adjacent the surface of the punch block 1104 that supports the top wall flanges. The other end of the punch shaft is contacted by a pusher plate 1112 which is selectively driven upward by a hydraulic cylinder 1114. As the punch shaft 1108 is forced upward by the hydraulic cylinder 1114, a rivet resting thereon is forced through the overlapping conduit top walls flanges into engagement with the anvil 1106. With continued upward movement, the anvil flares the ends of the rivet causing the lapped conduit flanges to be securely riveted together. To facilitate loading rivets, the anvil is mounted on a rotatable shaft 1120 which is selectively released by a locking means 1122. This enables the anvil to be rotated out of riveting position to facilitate reloading. The two lengths of conduit product may be connected together with a single rivet in each side flange or optionally may be connected with a plurality of rivets. When a plurality of rivets are used, a plurality of anvils and matching push rods are disposed along the punch block such that all the rivets are inserted simultaneously. In the preferred embodiment, the metalic rivets are used. It is contemplated, however, that plastic rivets, staples, sewing, and other mechanical fastening means, as well as adhesives, solvent welds, and other connecting means may also be utilized.

The invention has been described with reference to the preferred embodiment. Obviously, modifications and alterations will occur to others upon reading and understanding the preceeding description of the preferred embodiment. It is our intention that our invention be construed as including all such alterations and modifications insofar as they come within the scope of the appended claims or the equivalents thereof.

Having thus described our preferred embodiment, we now claim our invention to be:

1. An apparatus for manufacturing plastic conduit products which have a relatively strong top wall made up of a pair of side walls connected longitudinally at a apex area and having longitudinally extending base ends disposed opposite the apex area and having a flexible base connected adjacent the base ends of the side wall, the manufacturing apparatus comprising:
   tubular structure forming means for forming substantially continuously a tubular structure which includes at least two top walls connected together at their base ends;
   at least a pair of removable splitting blades mounted downstream from the tubular structure forming means and substantially normal to the tubular structure;
   guide means for guiding the tubing structure into the splitting blades such that the splitting blades split the connected base ends;
   at least a pair of dividers, each divider having a relatively sharp upstream edge disposed adjacent and downstream from one of the splitting blades for holding apart the base ends which have been separated by the splitting blades, each divider upstream edge being sufficiently sharp that when a worn splitting blade is removed, the divider upstream edge splits the connected base ends apart until a replacement splitting blade is mounted;
   attaching means for attaching a strip of flexible material adjacent the split apart base ends of each top wall to form the conduit products;
   flexible material feeding means for feeding at least one substantially continuous strip of flexible material to the attaching means; and,
   pulling means for pulling the conduit product to pull the top walls through the splitting blades and the attaching means and to pull the flexible strips through the attaching means.

2. The apparatus as set forth in claim 1 wherein the attaching means includes means for applying beads of softened plastic material to each of the base ends.

3. The apparatus as set forth in claim 2 wherein the attaching means further includes means for pressing the flexible strip against the softened plastic beads.

4. The apparatus as set forth in claim 3 wherein the pressing means includes at least one ribbed roller.

5. The apparatus as set forh in claim 3 wherein the attaching means further includes guide means for guiding the top wall structures adjacent the bead applying means and through the pressing means.

6. The apparatus as set forth in claim 5 further including a selectively removable plate assembly mounted on the guide means, the removable plate supporting at least one roller for pressing the flexible strip against the softened plastic beads.

7. The apparatus as set forth in claim 6 wherein the removable plate assembly further includes flexible strip centering means for adjustably centering the flexible strip relative to the top wall base ends.

8. An apparatus for manufacturing plastic conduit products which have a relatively strong top wall made up of a pair of side walls connected longitudinally at a apex area and having longitudinally extending base ends disposed opposite the apex area and having a flexible base connected adjacent the base ends of the side wall, the manufacturing apparatus comprising:
   means for conveying substantially continuously at least one conduit product top wall;

means for applying beads of hot, softened plastic material to each of the base ends, the plastic bead applying means including:
  an extruder for plasticizing and extruding plastic material with pressure and heat;
  a manifold for dividing a flow of plasticized material from the extruder to a plurality of applicators, each applicator having an internal bore through which a bead of plastic material is applied adjacent one of the base ends;
  a supplemental heating means disposed adjacent the internal bore for selectively adjusting the viscosity of the plastic material which adjusts a flow rate of the plasticized material therethrough;
flexible material feeding means for feeding at least one substantially continuous strip of flexible material adjacent the base ends;
a removable plate assembly including positioning means for selectively positioning a flexible strip relative to the base ends, the positioning means including an upper and a lower plate which are spring biased together, the flexible strip passing between the upper and lower plates;
a ribbed roller for pressing the flexible strip against the hot plastic bead and the base ends to be bonded therewith, the ribbed roller allowing the flexible strip to assume a wavey, pie crust-like configuration adjacent the hot plastic bead to accomodate thermal deformation of the flexible strip by heat from the hot plastic bead; and,
pulling means for pulling the conduit product to pull the top wall from the conveying means.

9. The apparatus as set forth in claim 8 wherein the conveying means includes tubular structure forming means for forming substantially continuously a tubular structure which includes at least two top walls connected together at their base ends and splitting means disposed downstream from the tubular structure forming means for splitting the connected top wall base ends apart, the top walls being conveyed from the splitting means to the attaching means.

10. The apparatus as set forth in claim 9 wherein the splitting means includes at least a pair of splitting blades disposed substantially normal to the tubular structure and guide means for guiding the tubular structure into the splitting blades such that the splitting blades split the connected base ends.

11. The apparatus as set forth in claim 8 further including at least one thermocouple disposed in a temperature sensing relationship with each applicator to monitor temperature and control said heating means to maintain the plastic material within the internal bore at the preselected temperature.

12. The apparatus as set forth in claim 8 further including perforating means for forming apertures in the conduit product.

13. The apparatus as set forth in claim 12 wherein the perforating means includes flexible strip perforating means for perforating the flexible strip as it is fed toward the attaching means.

14. The apparatus as set forth in claim 9 further including apex area perforating means for providing apertures in the top wall apex area.

15. The apparatus as set forth in claim 14 wherein the continuous molding means molds outward extruding projections on the apex area and wherein the apex area perforating means includes means for severing the projections.

16. The apparatus as set forth in claim 15 wherein the severing means includes a blade disposed tangentially to the apex area for cutting off the projections.

17. An apparatus for manufacturing plastic conduit products which have a relatively strong top wall made up of a pair of side walls connected longitudinally at a apex area and having longitudinally extending base ends disposed opposite the apex area and having a flexible base connected adjacent the base ends of the side wall, the manufacturing apparatus comprising:
  means for conveying substantially continuously at least one conduit product top wall:
  means for applying beads of softened plastic material to each of the base ends;
  a removable plate assembly including:
    positioning means for selectively positioning a flexible strip relative to the top wall, the positioning means includes an upper and a lower plate which are spring biased together, the flexible strip passing between the upper and lower plates, and
    a roller for pressing the flexible strip against the softened plastic bead, the positioning means being disposed adjacent the roller such that the flexible strip is fed through the positioning means and around the roller into contact with the base ends;
  flexible material feeding means for feeding the flexible strip to the positioning means; and,
  pulling means for pulling the conduit product to pull the top walls from the conveying means through the removable plate assembly and to pull the flexible strips through the removable plate assembly.

18. The apparatus as set forth in claim 17 wherein the flexible strip feeding means further includes a splicing means for splicing a trailing end of a first flexible material strip with a leading end of a second flexible material strip.

19. The apparatus as set forth in claim 18 wherein the feeding means further includes a means for detecting the trailing end of the first flexible strip, the detecting means actuating the splicing means to splice the first and second flexible strips together.

20. The apparatus as set forth in claim 19 wherein the splicing means includes means for defining a first guide path for receiving the first flexible strip and means for defining a second guide path for receiving the leading end of the second flexible strip.

21. The apparatus as set forth in claim 20 wherein the splicing means includes a pressing plate for selectively pressing the first and second flexible strips together and means for selectively moving the pressing plate into and out of its strip pressing position.

22. The apparatus as set forth in claim 21 wherein the pressing plate is spring biased at a angle relative to the path of the first flexible strip such that the pressing plate frictionally engages the first flexible strip with progressively increasing drag as the pressing plate moves to its strip pressing position.

23. An apparatus for manufacturing a pair of plastic conduit products each of which have a relatively strong top wall made up of a pair of side walls connected longitudinally at a apex area and having longitudinally extending base ends disposed opposite the apex area and having a flexible base connected adjacent the base ends of the side wall, the manufacturing apparatus comprising:

means for forming and conveying substantially continuously a pair of conduit product top walls, each top wall having a plurality of longitudinally extending rows of outward projecting dimples;

dimple severing means for severing the outward projecting dimples, the dimple severing means including a severing blade disposed in longitudinal alignment with each dimple row, each severing blade having a generally V-shaped notch disposed generally in line with the corresponding dimple row such that the projections are cut by the V-shaped notch in the blade;

a flexible material roll support stand including a stationary support, a first arm rotatably mounted on the stationary support, a first spindle being rotatably mounted adjacent a first end of the first rotatable arm, a second spindle being mounted adjacent the other end of the first rotatable arm, and first locking means for selectively locking the first rotatable arm against rotation, and a second arm rotatably mounted on the stationary support, a third spindle rotatably mounted at one end of the second arm, a fourth spindle rotatably mounted at the other end of the second arm, and a second locking means for selectively locking the second rotatable arm against rotation, a first flexible strip roll is mounted on the first spindle, a second flexible strip roll is mounted on the second spindle, a third flexible strip roll is mounted on the third spindle, and a fourth flexible strip roll is mounted on the fourth spindle;

a first splicing means for selectively splicing a trailing end of the first flexible strip roll with a leading end of the second flexible strip roll and a second splicing means for selectively splicing a trailing end of the third flexible strip roll with a leading end of the fourth flexible strip roll, the first and second splicing means being disposed downstream from the support stand;

an accumulator means for accumulating a reserve of the first and third flexible strips and for playing out a reserve of the first flexible strip as the first splicing means is splicing first and second rolls and for independently playing out a reserve of the third flexible strip as the second splicing means is splicing the third and fourth rolls, the accumulator being disposed downstream from the first and second splicing means;

flexible strip perforating means for perforating the flexible strips, the flexible strip perforating means being disposed downstream from the accumulator;

attaching means for attaching one of the perforated flexible material strips adjacent the base ends of each top wall to form a pair of the conduit products; and, pulling means for pulling the pair of conduit products to pull the top walls from the conveying means through the attaching means and to pull the flexible strips from the support stand and through the splicing means, the accumulator means, the flexible strip perforating means, and the attaching means.

24. Apparatus as set forth in claim 23 wherein the accumulator means includes:

a first guide set, a second guide set disposed opposite and generally parallel to the first guide set, the first and second guide sets being mounted to move toward and away from each other, the flexible strip passing over the first and second guide sets, and biasing means for biasing the first and second guide sets apart, the biasing means including a hydraulic cylinder connected with a hydraulic reservoir and a pneumatic pressuring means for selectively applying pressurized compressible fluid to substantially incompressible hydraulic fluid in the hydraulic reservoir, whereby the pneumatic pressurizing force determines a first force and the compressibility of the compressible fluid determines a second force with which the hydraulic cylinder biases the first and second guide sets apart.

25. The apparatus as set forth in claim 24 further including a bracket for supporting the first guide set, the bracket being movable in a track disposed generally perpendicular to the first and second guide sets such that the first guide set is movable toward and away from the second guide set.

26. The apparatus as set forth in claim 24 wherein one of the first and second guide sets includes rollers mounted on relatively long arms and disposed to pass between and past the other guide set as the guide sets move toward each other, such that the flexible strip can be fed linearly between the first and second guide sets and as the guide sets are spread apart the flexible strip becomes threaded in a generally zig zag path, whereby threading a flexible strip around the guides is facilitated.

27. An apparatus for manufacturing plastic conduit products which have a relatively strong top wall made up of a pair of side walls connected longitudinally at a apex area and having longitudinally extending base ends disposed opposite the apex area and having a flexible base connected adjacent the base ends of the side wall, the manufacturing apparatus comprising:

means for conveying substantially continuously at least one conduit product top wall;

attaching means for attaching a strip of flexible material adjacent the base ends of each top wall to form the conduit products;

flexible material feeding means for feeding at least one substantially continuous strip of flexible material to the attaching means, the flexible strip feeding means including a splicing means for splicing a trailing end of a first flexible material strip with a leading end of a second flexible material strip, the splicing means including:

means for defining a first guide path for receiving the first flexible strip, means for defining a second guide path for receiving the leading end of the second flexible strip, a stripper plate having a plurality of spaced guide slots disposed adjacent the guide path defining means, a heater means having a plurality of heated portions which are disposable through the guide slots, and means for moving the heated portions through the guide slots and into engagement with the first and second flexible strips to fuse the flexible strips together; and, pulling means for pulling the conduit product to pull the top walls from the conveying means through the attaching means and to pull the flexible strips through the splicing and the attaching means.

28. The apparatus as set forth in claim 27 wherein the flexible material feeding means includes a stand having at least a first spindle for holding a first flexible material strip roll for attachment to the top wall by the attaching means and a second spindle for holding a second flexible material strip roll.

29. The apparatus as set forth in claim 28 wherein the stand includes a stationary support, a first arm rotatably mounted on the stationary support, the first spindle being rotatably mounted adjacent a first end of the first rotatable arm, the second spindle being mounted adjacent the other end of the first rotatable arm, and first locking means for selectively locking the first rotatable arm against rotation.

30. The apparatus as set forth in claim 29 where the stand further includes a first brake means disposed between the first spindle and the first rotatable arm for controlling rotation of the first spindle and a second brake means disposed between the second spindle and the first rotatable arm.

31. The apparatus as set forth in claim 29 wherein the stand further includes an elongated arm extending from the stationary support, a light source mounted on the elongated arm, a reflector disposed generally between the first and second spindles and a light detector mounted on the elongated arm for detecting light from the light source reflected by the reflector, whereby the detection or non-detection of light indicates the presence or absence, respectively, of the first flexible strip between the reflector and at least one of the light source and first light detector.

32. The apparatus as set forth in claim 27 wherein the splicing means further includes a knife means for selectively severing the first flexible strip between the trailing end and the fusion with the second strip.

33. The apparatus as set forth in claim 27 wherein in the splicing means for first and second guide paths are defined on either side of a movable plate such that by moving and repositioning the movable plate, the second flexible strip is movable from the second guide path to the first guide path.

34. The apparatus as set forth in claim 33 wherein the first guide path is further defined by a tensioning plate disposed closely adjacent the movable plate such that the spacing between the movable and tensioning plates determines the tension of the flexible strip passing therebetween.

35. The apparatus as set forth in claim 34 wherein the splicing means further includes adjustment means for selectively moving the flexible plate toward and away from the movable plate, whereby the adjustment means adjusts the tension of the flexible strip passing therebetween.

36. The apparatus as set forth in claim 27 further including an accumulator means for accumulating a reserve of the flexible strip between splices and playing out flexible strip reserve during a splice.

37. An apparatus for manufacturing plastic conduit products which have a relatively strong top wall made up of a pair of side walls connected longitudinally at a apex area and having longitudinally extending base ends disposed opposite the apex area and having a flexible base connected adjacent the base ends of the side wall, the manufacturing apparatus comprising:
means for conveying substantially continuously at least one conduit product top wall;
attaching means for attaching a strip of flexible material adjacent the base ends of each top wall to form the conduit products; flexible material feeding means for feeding at least one substantially continuous strip of flexible material to the attaching means, the feeding means including flexible strip perforating means for perforating the flexible strip as it is fed to the attaching means, the flexible strip perforating means including a generally rectilinear cross sectioned roller having a plurality of corners around which the flexible strip passes, each of the corners having tangential slots therethrough, and a rotating knife means having knife blades aligned with the tangential slots and disposed to pass through the tangential slots as the corner and the knife blades come into association such that the flexible strip is slit; and,
pulling means for pulling the conduit product to pull the top walls from the conveying means through the attaching means and to pull the flexible strips through the attaching means.

38. The apparatus as set forth in claim 37 wherein the knife means are rotatably mounted in such a position that they pass through the tangential slots in the corners of the rectilinear roller but do not interact with the flexible material in regions between the corners.

39. The apparatus as forth in clam 38 further including means for rotating the knife blades more rapidly than the rectilinear roller.

40. An apparatus for manufacturing plastic conduit products which have at least one relatively strong side wall, the manufacturing apparatus comprising:
tubular structure forming means for forming substantially continuously a tubular plastic structure which includes at least one side wall, the side wall having a plurality of longitudinally extending rows of outward projecting dimples projecting outward therefrom;
dimple severing means for severing the outward projecting dimples, the dimple severing means including a severing blade disposed in longitudinal alignment with each dimple row, each severing blade having a generally V-shaped notch disposed generally in line with the corresponding dimple row such that the projections are cut by the V-shaped notch in the blade; and,
pulling means for pulling the conduit product to pull the conduit products from the conveying means through the dimple severing means.

41. The apparatus as set forth in claim 40 further including a deflector means disposed adjacent the blade for inhibiting the projections from rotating out of contact with the blade as they are cut, whereby the deflector helps to assure that the projections are severed completely.

42. The apparatus as set forth in claim 40 further including a deflector means disposed adjacent the severing blade for inhibiting the dimples from rotating out of contact with the severing blade as the wall moves longitudinally.

43. The apparatus as set forth in claim 42 wherein the deflector means has a longitudinally extending surface disposed upstream from the severing blade along which the rows of dimples slide as the wall moves longitudinally towards the severing blade.

44. The conduit perforating apparatus as set forth in claim 43 wherein the deflecting means longitudinally extending surface curves outward proximate the severing blade to allow each dimple to move outward a controlled amount as the severing blade severs the dimple from the wall.

45. An apparatus for manufacturing plastic conduit products which have a relatively strong, foldable top wall made up of a pair of side walls foldably connected longitudinally at a apex area and having longitudinally extending base ends disposed opposite the apex area and having a flexible base connected adjacent the base ends of the side wall, the manufacturing apparatus comprising:

- tubular structure forming means for forming substantially continuously a tubular structure which includes at least two top walls connected together at their base ends;
- at least a pair of removable splitting blades mounted downstream from the tubular structure forming means and substantially normal to the tubular structure;
- guide means for guiding the tubing structure into the splitting blades such that the splitting blades split the connected base ends;
- at least a pair of dividers, each divider having a relatively sharp upstream edge disposed adjacent and downstream from one of the splitting blades for holding apart the base ends which have been separated by the splitting blades, each divider upstream edge being sufficiently sharp that when a worn splitting blade is removed, the divider upstream edge splits the connected base ends apart until a replacement splitting blade is mounted;
- attaching means for attaching a pair of strips of flexible material, one adjacent the base ends of each top wall to form the conduit products;
- flexible material feeding means for feeding the pair of substantially continuous strips of flexible material to the attaching means; and,
- pulling means for folding and pulling the conduit products, the pulling means comprising:
  - a first frame,
  - a second frame,
  - a first pair of belts for receiving one of the top walls therebetween in a folded configuration, the first belt pair including a first belt mounted on the first frame and a second belt mounted on the second frame,
  - a second pair of belts for receiving the other top wall therebetween in a folded configuration, the second belt pair including a third belt mounted on the first frame and a fourth belt mounted on the second frame,
  - a first rotatable drive wheel operatively connected with the first and third belts for rotating the first and third belts therewith,
  - a second rotatable drive wheel operatively connected with the second and fourth belts for rotating the second and fourth belt therewith,
  - a flexible drive which drives the first and second wheels, the first and second belts, and the third and fourth belts in opposite directions causing the adjacent portions of the belts to move in the same direction,
  - belt adjusting means for adjusting the distance between the first and second frames, adjusting the distance between the first and second drive wheels and adjusting the distance between the first and second belts and the third and fourth belts such that the adjusting means adjusts squeezing of the folded top walls between the first and second belts and the third and fourth belts, and
  - tension maintaining means around which the flexible drive wraps for maintaining tension on the flexible drive as the belt adjusting means adjusts the distances between the first and second drive wheels.

46. The apparatus as set forth in claim 45 wherein the tension maintaining means includes an idler wheel over which the flexible drive passes and biasing means for biasing the idler wheel to maintain the tension on the flexible drive.

47. The apparatus as set forth in claim 46 wherein the idler wheel is slidably mounted on a generally vertically disposed guide, and wherein the biasing means includes a weight whereby the idler means is biased by gravity acting on the weights.

48. The apparatus as set forth in claim 45 further including cut off means disposed downstream from the pulling means for selectively cutting off the conduit product.

49. An apparatus for manufacturing plastic conduit products which have at least one relatively strong side wall, the manufacturing apparatus comprising:

- tubular structure forming means for forming substantially continuously a tubular plastic structure which includes the at least one side wall, the side wall having a plurality of longitudinally extending rows of outward projecting dimples projecting outward therefrom;
- dimple severing means for severing the outward projecting dimples, the dimple severing means including a severing blade disposed in longitudinal alignment with each dimple row, each severing blade having a notch disposed generally in line with the corresponding dimple row such that the projections are cut by the notch in the blade;
- pulling means for pulling the conduit product from the tubular structure forming means and through the dimple severing means; and,
- cut off means disposed downstream from the pulling means for selectively cutting off the conduit product, the cut off means including a non-rotating knife blade for cutting the conduit and a fluid driven cylinder for selectively driving the knife blade linearly through the conduit product.

50. The apparatus as set forth in claim 49 wherein the pulling means includes at least one pair of parallel disposed belts, the pair of belts being adapted to receive a conduit product therebetween, and drive means for rotating the belts such that the conduit products are pulled thereby.

51. The apparatus as set forth in claim 50 further including a first driven wheel which is connected to a first one of the belts in the pair and a second driven wheel which is operatively connected with a second one of the belts in the pair and a flexible drive wrapped around the first drive wheel in one direction and the second drive wheel in another direction such that the flexible drive drives both drive wheels and both belts in opposite directions.

52. The apparatus as set forth in claim 49 further including measuring means for measuring the length of conduit product conveyed through the pulling means, the measuring means being operatively connected with the cut off means for cutting off a preselected length of conduit product.

53. The apparatus as set forth in claim 52 wherein the measuring means includes a wheel which is rotated by passing conduit product and a counter for counting rotation of the wheel.

54. The apparatus as set forth in claim 49 further including a first winding means for winding a first folded conduit product from the pulling means on a first reel and a second winding means for winding a second folded conduit product from the pulling means on a second reel.

55. The apparatus as set forth in claim 54 further including conduit connecting means for connecting together a first and a second portion of one of the first and second conduits.

56. The apparatus as set forth in claim 55 wherein the conduit connecting means includes a receiving area for receiving conduit top walls of the first and second portions in an overlapping position and means for inserting a mechanical fastener through the overlapped top walls.

57. The apparatus as set forth in claim 56 wherein the mechanical fastener inserting means is a riveting means.

* * * * *